(12) United States Patent
Zou et al.

(10) Patent No.: US 11,569,941 B2
(45) Date of Patent: Jan. 31, 2023

(54) CONFIGURING PUNCTURE BUNDLES OF DATA FOR A FIRST SERVICE IN A TRANSMISSION OF A SECOND SERVICE

(71) Applicant: TELEFONAKTIEBOLAGET LM ERICSSON (PUBL), Stockholm (SE)

(72) Inventors: Zhenhua Zou, Solna (SE); Shehzad Ali Ashraf, Aachen (DE); Yufei Blankenship, Kildeer, IL (US); Caner Kilinc, Luleå (SE); Zhan Zhang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 24 days.

(21) Appl. No.: 17/168,332

(22) Filed: Feb. 5, 2021

(65) Prior Publication Data
US 2021/0184797 A1 Jun. 17, 2021

Related U.S. Application Data

(63) Continuation of application No. 15/776,953, filed as application No. PCT/EP2018/056823 on Mar. 19, (Continued)

(51) Int. Cl.
*G01R 31/28* (2006.01)
*H04L 1/08* (2006.01)
(Continued)

(52) U.S. Cl.
CPC .............. *H04L 1/08* (2013.01); *H04L 1/1812* (2013.01); *H04L 5/0044* (2013.01); *H04L 5/0092* (2013.01); *H04L 5/0046* (2013.01)

(58) Field of Classification Search
CPC ....... H04L 1/08; H04L 1/1812; H04L 5/0044; H04L 5/0092; H04L 5/0046
(Continued)

(56) References Cited

U.S. PATENT DOCUMENTS

2009/0109999 A1* 4/2009 Kuri ................... H04L 27/2602
370/465
2011/0243087 A1 10/2011 Ahn et al.
(Continued)

FOREIGN PATENT DOCUMENTS

CN 103348633 A 10/2013
CN 103402219 A 11/2013
(Continued)

OTHER PUBLICATIONS

3GPP TSG RAN WG1 AH_NR Meeting, Spokane, USA, Jan. 16-20, 2017, "Discussion on URLLC transmission aspects," R1-1700455, 5.1.3.4, 4 pages.
(Continued)

*Primary Examiner* — Albert Decady
*Assistant Examiner* — Enamul M Kabir
(74) *Attorney, Agent, or Firm* — Patent Portfolio Builders PLLC

(57) ABSTRACT

A transmitting node determines data for a first service will be transmitted during a time period when data for a second service will be transmitted. The data for the first service requires lower latency than the data for the second service and the data for the first service includes an original set of data for the first service and at least one repetition of the original set of data for the first service. The transmitting node adjusts resources consumed by the data for the first service based on available transmission resources. During the time period the transmitting node then transmits the data for the first service using the adjusted resources while data for the second service is transmitted during the time period.

27 Claims, 17 Drawing Sheets

Related U.S. Application Data 2018, now Pat. No. 10,965,402, which is a continuation-in-part of application No. PCT/CN2017/077816, filed on Mar. 23, 2017.

(51) Int. Cl.
  *H04L 1/18* (2006.01)
  *H04L 5/00* (2006.01)

(58) Field of Classification Search
  USPC .......................................................... 714/729
  See application file for complete search history.

(56) References Cited

U.S. PATENT DOCUMENTS

| | | | |
|---|---|---|---|
| 2015/0237644 | A1 | 8/2015 | Elbwart et al. |
| 2016/0088652 | A1 | 3/2016 | Patel et al. |
| 2016/0192261 | A1 | 6/2016 | Wang et al. |
| 2016/0234857 | A1* | 8/2016 | Chen ..................... H04L 5/0044 |
| 2016/0361593 | A1 | 12/2016 | Elliott |
| 2017/0230994 | A1 | 8/2017 | You et al. |
| 2017/0285130 | A1 | 10/2017 | Kim et al. |
| 2017/0311182 | A1 | 10/2017 | Tenny et al. |
| 2017/0332369 | A1* | 11/2017 | Hosseini ........... H04W 72/0413 |
| 2017/0359807 | A1* | 12/2017 | Hong ................. H04W 72/0446 |
| 2018/0227047 | A1* | 8/2018 | Hosseini ............... H04L 5/1469 |
| 2018/0227833 | A1 | 8/2018 | Belleschi et al. |
| 2018/0324831 | A1 | 11/2018 | Frederiksen et al. |
| 2018/0375616 | A1 | 12/2018 | Beale et al. |
| 2019/0268938 | A1* | 8/2019 | Zhao ..................... H04W 80/08 |
| 2019/0296861 | A1 | 9/2019 | Zou et al. |
| 2019/0320435 | A1* | 10/2019 | Yu ...................... H04W 72/0413 |
| 2019/0349136 | A1 | 11/2019 | Kilinc et al. |
| 2020/0015249 | A1* | 1/2020 | Li ...................... H04W 72/1284 |

FOREIGN PATENT DOCUMENTS

| | | |
|---|---|---|
| CN | 103597783 A | 2/2014 |
| CN | 104702702 A | 6/2015 |
| CN | 106535258 A | 3/2017 |
| IN | 201637022003 A | 8/2016 |
| JP | 2018511203 A | 4/2018 |
| TW | 201004209 A | 1/2010 |
| WO | 2015112526 A1 | 7/2015 |
| WO | 2016126398 A1 | 8/2016 |
| WO | 2017036328 A1 | 3/2017 |

OTHER PUBLICATIONS

3GPP TSG-RAN WG1 NR AH, Spokane, WA, USA, Jan. 16-20, 2017, R1-1701023, 5 1.3 4, "Punctured Scheduling for Low Latency Downlink Transmissions," 5 pages.
Chinese Search Report dated Sep. 18, 2021 in corresponding/related Chinese Patent Application No. 201880033942.6.
Office Action dated Sep. 28, 2021 in related/corresponding Chinese Patent Application No. 201880033942.6.
Office Action received in related Chinese Patent Application No. 2018800339214, dated Oct. 11, 2021, 16 pages.
Search Report received in related Chinese Patent Application No. 2018800339214, dated Sep. 27, 2021, 5 pages.
Examination Report dated Dec. 31, 2019 in related/corresponding Indian Application No. 201637022003.
3GPP TR 38.802, V1.0.0, "3rd Generation Partnership Project; Technical Specification Group Radio Access Network; Study on New Radio (NR) Access Technology Physical Layer Aspects—Release 14", Nov. 2016, pp. 1-64.
3GPP TS 36.213, V14.0.0, "3rd Generation Partnership Project; Technical Specification Group Radio Access Network; Evolved Universal Terrestrial Radio Access (E-UTRA); Physical layer procedures—Release 14", Sep. 2016, pp. 1-406.
3GPP TSG-RAN WG2 NR Ad Hoc, "Overview of URLLC", Jan. 17-19, 2017, Spokane, Washington, pp. 1-7.
Ericsson; "Discussion on V2X PC5 Scheduling, Resource Pools and Resource Patterns"; 3GPP TSG RAN WG1 Meeting #84, R1-161075, February 15-19; Malta; pp. 1-9.
Erricsson; "On indication for downlink punctured / preemptive scheduling"; 3GPP TSG-RAN WG1#88; R1-1703327; Feb. 13, 17, 2017; pp. 1-4; Athens, Greece.
Huawei, HiSilicon, "DL control and data channel reliability considerations for URLLC," 3GPP TSG RAN WG1 Meeting #88, Athens, Greece, Feb. 13-17, 2017, R1-1701664, 8 pages.
Huawei, HiSilicon, "On UL multiplexing of URLLC and eMBB transmissions," 3GPP TSG RAN WG1 Meeting #88, Athens, Greece, Feb. 13-17, 2017, R1-1701666, 8 pages.
Huawei, HiSilicon, "Support of URLLC in UL," 3GPP TSG RAN WG1 NR Ad Hoc Meeting, Spokane, Washington, USA, Jan. 16-20, 2017, R1-1700024, 16 pages.
Huawei, HiSilicon, "UL Grant-free transmission," 3GPP TSG RAN WG1 Meeting #88, Athens, Greece, Feb. 13-17, 2017, R1-1701665, 15 pages.
Intel Corporation, "Downlink Multiplexing of eMBB and URLLC Transmissions," 3GPP TSG RAN WG1 NR Ad-Hoc Meeting, Spokane, USA, Jan. 16-20, 2017, R1-1700374, pp. 1-12.
International Search Report and Written Opinion of the International Searching Authority in International Application No. PCT/EP2018/056823 dated Jun. 6, 2018.
International Search Report in International Application No. PCT/EP2018/056819 dated Jun. 4, 2018.
Japanese Office Action for corresponding/related Japanese Application No. 2019-552499, dated Jan. 15, 2021, including an English translation.
Japanese Office Action for corresponding/related Japanese Application No. 2019-552553, dated Dec. 14, 2020, including an English translation.
LG Electronics, "SLS results on coexistence between eMBB and URLLC," 3GPP TSG RAN WG1 NR Ad-Hoc Meeting, Spokane, USA, Jan. 16-20, 2017, R1-1700515, pp. 1-7 (8 pages total).
NTT Docomo, "Views on multiple repetition levels for PDSCH/PUSCH," 3GPP TSG RAN WG1 Meeting #81, Fukuoka, Japan, May 25-29, 2015, R1-153323, pp. 1-3.
Office Action in corresponding/related U.S. Appl. No. 16/060,452 dated Dec. 5, 2019.
Office Action in related/corresponding U.S. Appl. No. 15/776,953 dated Mar. 19, 2020.
Qualcomm Incorporated, "DL URLLC/eMBB dynamic multiplexing and indication design," 3GPP TSG-RAN WG1 #88, Athens, Greece, Feb. 13-17, 2017, R1-1702639, pp. 1-9.
Samsung, "Performance of preemption based multiplexing for eMBB and URLLC" 3GPP TSG RAN WG1 Meeting #88, Athens, Greece, Feb. 13-17, 2017, R1-1702999, 8 pages.
Written Opinion in International Application No. PCT/EP2018/056819 dated Jun. 4, 2018.
ZTE, ZTE Microelectronics, "Consideration on URLLC in NR frame structure," 3GPP TSG-RAN WG1 Meeting #85, Nanjing, China, May 23-27, 2016, R1-165083, pp. 1-5.

\* cited by examiner

CONFIGURING PUNCTURE BUNDLES OF DATA FOR A FIRST SERVICE IN A TRANSMISSION OF A SECOND SERVICE

BACKGROUND

Wireless communications occur in an environment with unpredictable interference and channel variations. HARQ (Hybrid Automatic Repeat Request) is a common technique used to address the unpredictable interference and channel variations. HARQ involves a wireless device receiving an uplink or downlink transmission to attempt to decode a data message in the transmission.

FIG. 1 is a signaling diagram of a conventional HARQ technique employed between transmitting node 105 and receiving node 110 in an LTE system. Initially, the transmitter 105 transmits up to two transport blocks in a TTI (Transmission Time Interval) to receiving node 110 (step 115). An example of this transmission is illustrated in FIG. 2 in which $TTI_1$ includes two transport blocks and $TTI_2$ includes two transport blocks. Receiving node 110 then determines whether each of the two transport blocks was successfully received (step 120). Because LTE (Long Term Evolution) provides for up to two transport blocks per TTI, the receiving node 110 transmits a HARQ-ACK (ACKnowledgement) consisting of 2 bits, each bit indicating success or failure of a respective transport block, to the transmitting node 105 (step 125).

The transmitter then determines, based on the value of the bits in the HARQ-ACK, whether one or more transport blocks were not successfully decoded (step 130). If so, the transmitting node 105 transmits the unsuccessfully decoded transport block(s) to the receiving node 110 (step 135). The receiving node 110 then attempts to decode the unsuccessfully decoded transport block by soft combining it with the retransmitted transport block (step 140). The type of soft combining can vary, and can involve the well-known Chase or Incremental Redundancy soft combining techniques. Soft combining greatly increases the probability of successful decoding.

LTE, which is a standard in 3GPP family of wireless systems, is highly optimized for MBB (Mobile BroadBand) traffic. The TTI (subframe) has duration of 1 ms and, for FDD (Frequency Division Duplex) the HARQ-ACK is transmitted in subframe n+4 for a data transmission in subframe n.

URLLC (Ultra-Reliable Low Latency Communication) is data service with extremely strict error and latency requirements, including error probabilities as low as $10^{-5}$ or lower and end-to-end latency or lower 1 ms. Other services have similar error and latency requirements, such as the so-called short TTI in LTE.

Although the fifth generation of mobile telecommunications and wireless technology is not yet fully defined, it is in an advanced draft stage within 3GPP and includes work on 5G New Radio (NR) Access Technology. Accordingly, it will be appreciated that although LTE terminology is used in some portions of the disclosure, the disclosure equally applies to equivalent 5G entities or functionalities despite the use of terminology differing from what is specified in 5G. 3GPP TR 38.802 V1.0.0 (2016 November) provides a general description of the current agreements on 5G New Radio (NR) Access Technology and final specifications may be published inter alia in the future 3GPP TS 38.2** series.

MBB or eMBB (enhanced MBB) and URLLC are both among a wide range of data services being targeted for 5G. To enable services with an optimized performance, the TTI lengths are expected to be different for different services, wherein a TTI may correspond to a subframe, a slot, or a mini-slot. Specifically, URLLC may have a shorter TTI length compared to MBB.

Accommodating both MBB and URLLC in the same network introduces conflicts due to the strict latency requirements of URLLC. These conflicts can result in problems decoding either or both of the MBB and URLLC data when the data needs to be transmitted at the same time. Although HARQ is a common way of addressing decoding problems, implementing HARQ in a network accommodating both MBB and URLLC can be difficult due to the strict latency requirements of URLLC. Specifically, although conventional HARQ procedures can be implemented for the MBB data, conventional HARQ procedures likely cannot meet the strict latency requirements of URLLC data.

SUMMARY

Exemplary aspects of the present disclosure are directed to method implemented in a transmitting node. The transmitting node determines that data for a first service will be transmitted during a first time period when data for a second service will be transmitted. The data for the first service requires lower latency than the data for the second service and the data for the first service includes an original set of data for the first service and at least one repetition of the original set of data for the first service. The transmitting node adjusts resources consumed by the data for the first service based on available transmission resources. The transmitting node then transmits, during the first time period, the data for the first service using the adjusted resources while data for the second service is transmitted during the first time period.

Other aspects of the disclosure are directed to a transmitting node for carrying out this method, as well as a computer-readable medium comprising code, which when executed by a processor, causes the processor to perform this method.

An aspect of the disclosure is directed to a method implemented in a receiving node. The receiving node receives a transmission during a first period of time. The transmission includes data for a first service and data for a second service, wherein the data for the first service requires lower latency than the data for the second service. The receiving node then determines an arrangement of the data for the first service based on an indicator in the received transmission. The receiving node attempts to decode the data for the first service based on the determined arrangement of data for the first service.

Other aspects of the disclosure are directed to a receiving node for carrying out this method, as well as a computer-readable medium comprising code, which when executed by a processor, causes the processor to perform this method.

DETAILED DESCRIPTION

Figure 3A:
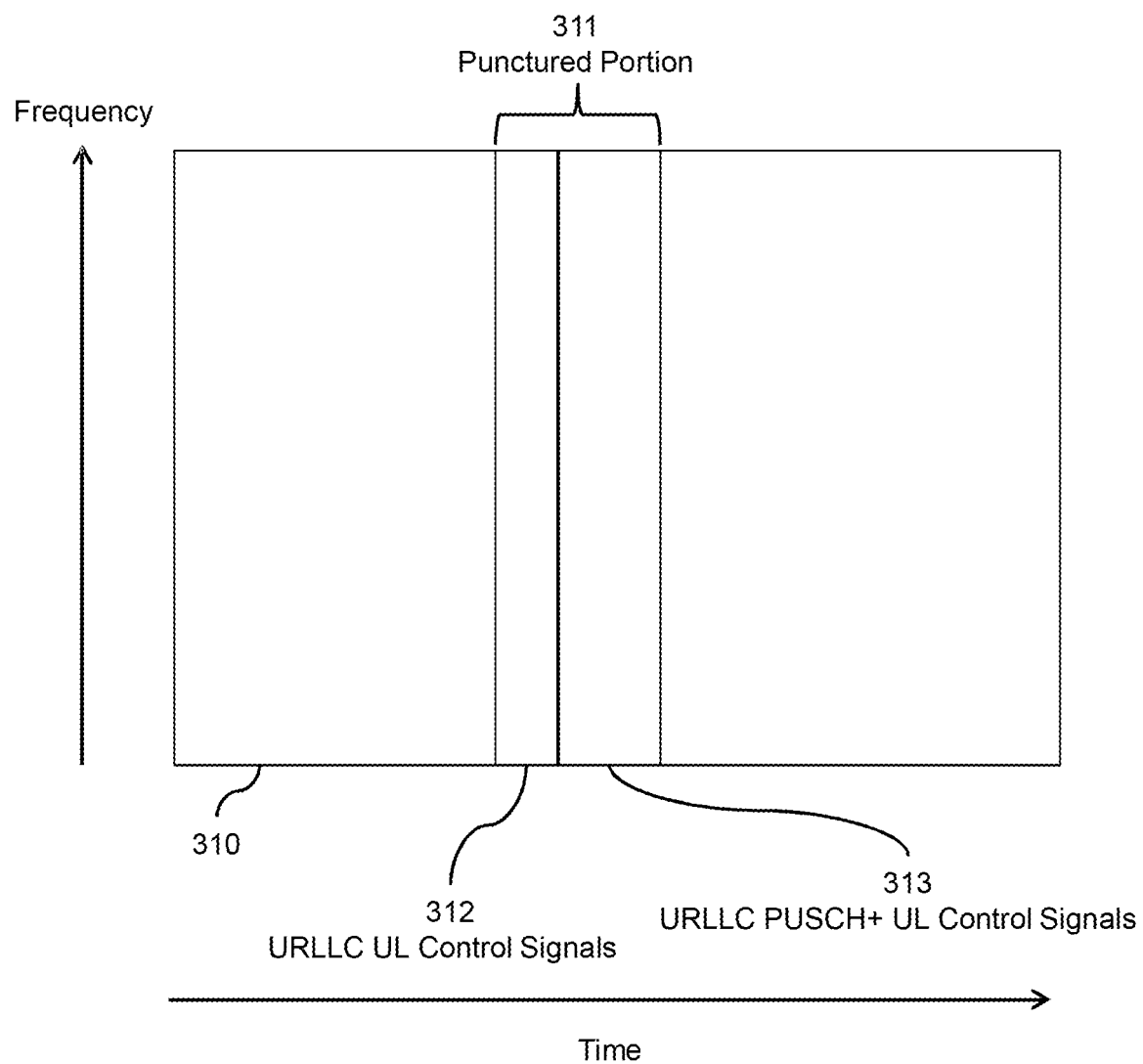
FIGS. 3A and 3B are block diagrams of exemplary punctured uplink and downlink transmissions.
Figure 3B:
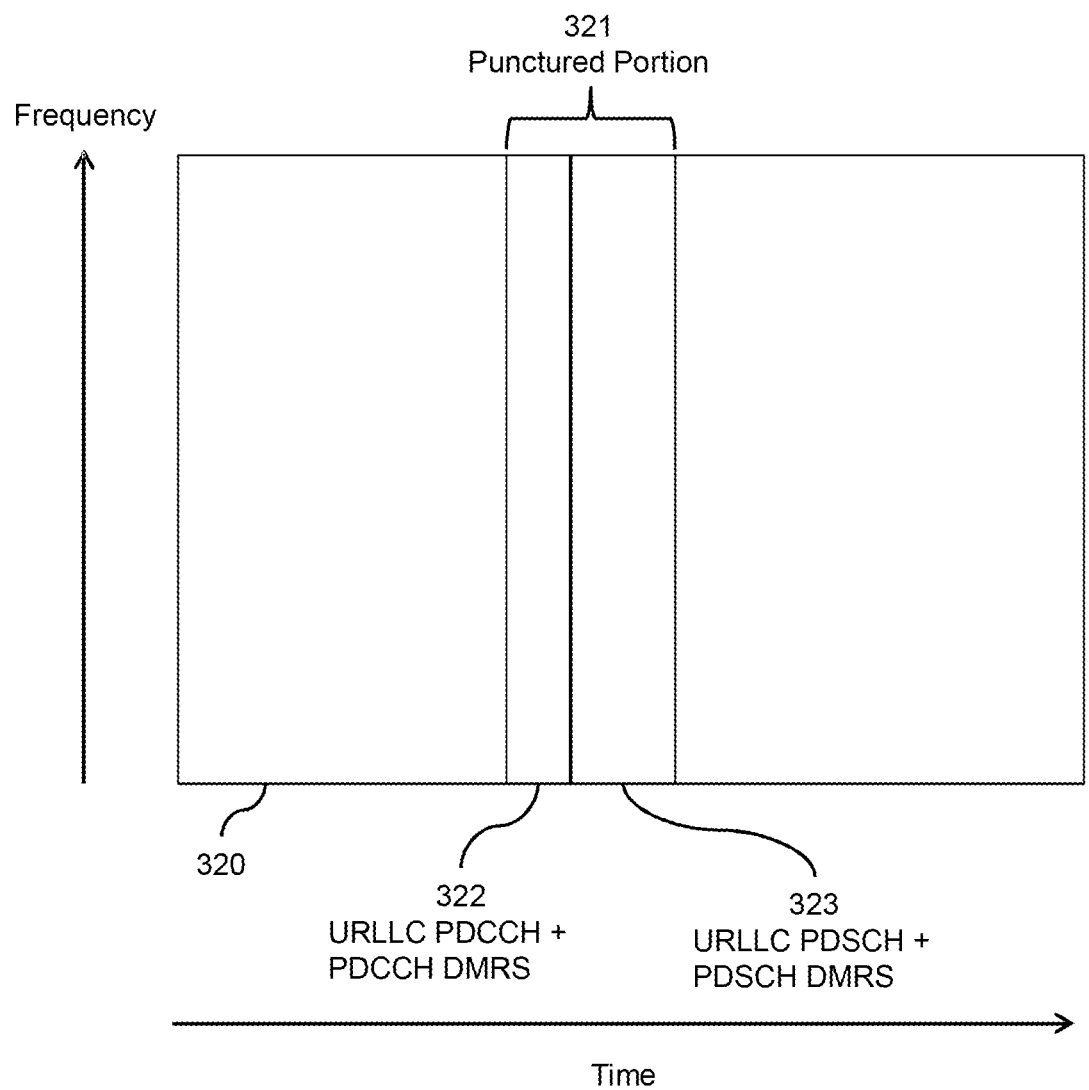

One way to accommodate both URLLC and MBB in the same network is to allow URLLC transmissions to puncture MBB transmissions, examples of which are illustrated in FIGS. 3A and 3B. FIG. 3A illustrates a portion 311 of the time-frequency resources of an uplink MBB transmission 310 being punctured to a include an URLLC transmission, i.e., a URLLC uplink control signals portion 312 and a URLLC PUSCH (Physical Uplink Shared Channel) and uplink control signals portions 313. FIG. 3B illustrates a portion 321 of a downlink MBB transmission 320 being punctured to include an URLLC transmission, i.e., a PDCCH (URLLC Physical Downlink Control Channel) and PDCCH DMRS (DeModulation Reference Signal) portion 322 and a URLLC PDSCH and PDSCH (Physical Downlink Shared Channel) DMRS portion 323.

Although this puncturing allows provision of both MBB and URLLC in the same network and allows URLLC transmissions to meet the strict timing requirements, problems can arise in the decoding of the transmitted data. Because MBB transmissions are less time sensitive (compared to URLLC), decoding problems can be addressed using HARQ in a number of different TTIs. For example, in LTE one TTI, which is one subframe, has a duration of 1 ms and for FDD the data originally transmitted during subframe n is retransmitted in subframe n+4. In the LTE uplink the HARQ retransmission timing is fixed and the HARQ retransmission process typically takes 8 ms for each retransmission. This delay may be acceptable for MBB or eMBB because it is less time-sensitive. URLLC, however, is time sensitive and a retransmission separated from the original transmission by up to 8 ms will likely result in the retransmitted data arriving too late for it to be used by the receiver.

Accordingly, this conventional HARQ process cannot adequately support URLLC in the same network as MBB. Although this discussion is in connection with URLLC transmissions puncturing MBB transmission, the disclosure is equally applicable to puncturing transmissions of a second service by transmissions of a first service, where the first service is more time sensitive than the second service. In other words, the second service can still be time sensitive, it is just less time sensitive than the first service.

Exemplary embodiments of the present disclosure provide ways to address problems of decoding transmissions for a first service requiring low latency in the same network that may simultaneously transmit for a second service that does not have the low latency requirements as the first service. When a transmitter determines that it cannot adjust transmission parameters, the transmitter can automatically activate puncture bundling without the need for initial control signaling. The puncture bundling involves the transmission of the original data for the first service requiring low latency along with one or more repetitions of the original data, which can be coded the same or differently from the original data, into the same TTI of data transmissions for a second service. In each case, the different redundancy versions or the repeated same redundancy version (RV) of the first service punctures the transmissions of the second service. The data of the first service can be punctured into one transport block (TB), two transport blocks, or more than two transport blocks of the data for the second service.

Redundant transmissions of low latency data in a TTI carrying data for a second service eliminates the waiting time between retransmissions normally required due to the transmission of a NACK (Negative ACKnowledgement) and the subsequent retransmission, which allows the low latency data to be successfully decoded while satisfying the latency requirements for the low latency data. This also provides signaling efficiency because it does not require control signaling to carry the NACK (or ACK for successfully decoded data) and provides robustness due to the repetition of data for the low latency service within a TTI of a second service.

FIGS. 4-7 are block diagrams of punctured transmissions with redundancy for low latency data in accordance with exemplary embodiments of the present disclosure. In these examples the original data for the first service and each of the repetitions can be replicas of each other, i.e., the same data coded in the same manner, or the data in each punctured portion can be different versions of each other, i.e., coded differently but carrying the same underlying control and user data that can be recovered after decoding. In the latter case the coding can be taken from a coding list of (0, 3, 2, 1), in which the numbers correspond to redundancy versions that will be used in incremental combining, and if there are more than four repetitions the additional repetitions start again from the beginning of the coding list.

Figure 4:
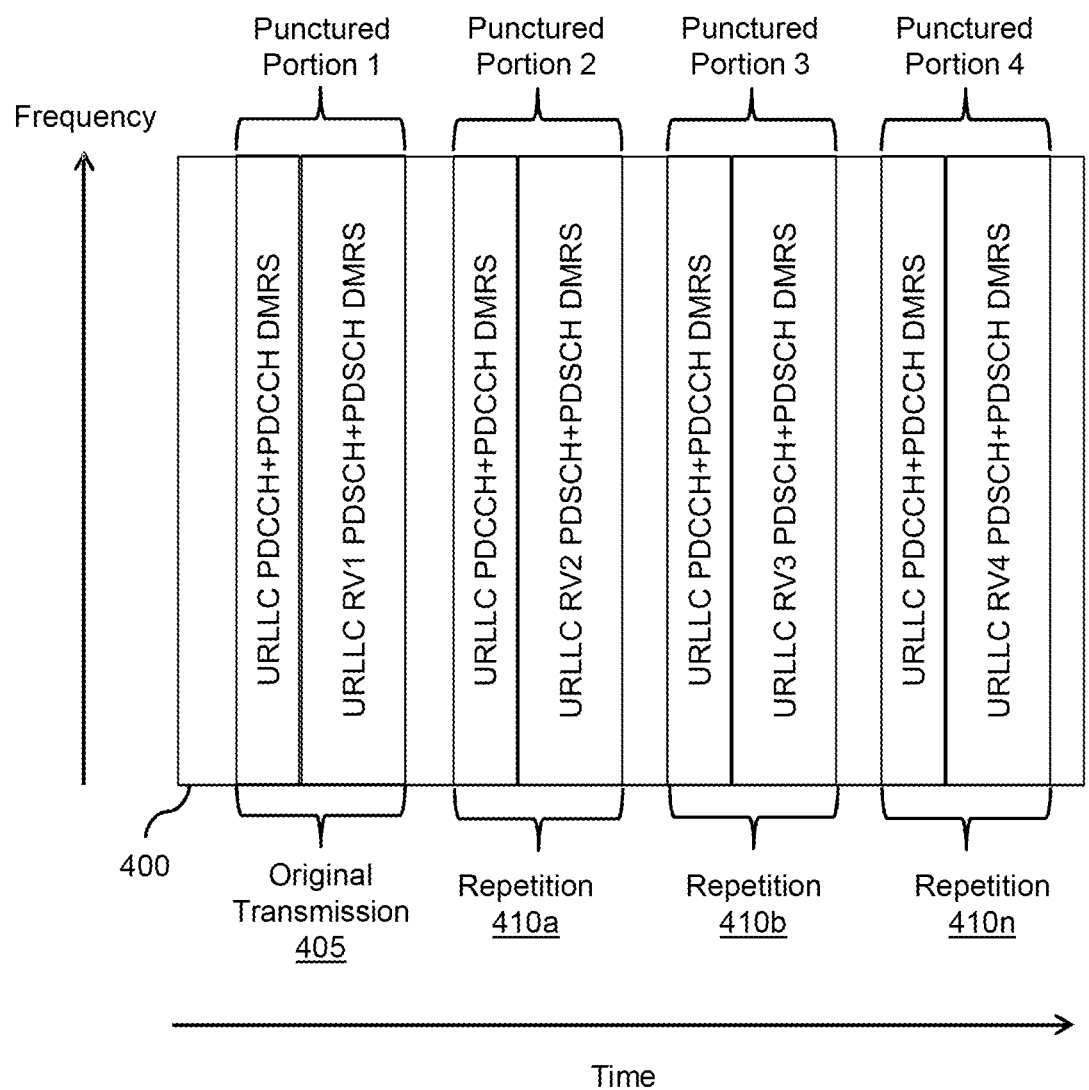
FIG. 4 is a block diagram of a punctured transmission with repeated control data and user data in accordance with exemplary embodiments of the present disclosure.

The transmission in FIG. 4 is a single TTI 400 for the second service, which does not have strict latency requirements, punctured four times by data for the first service, which has strict latency requirements. Specifically, the data for the first service includes an original transmission 405 of control data, which in this example is URLLC PDCCH+PDCCH DMRS, and user data, which in this example is URLLC PDSCH+PDSCH DMRS. The data for the first service also includes three repetitions 410a-410n, each of which includes control data, which in this example is URLLC PDCCH+PDCCH DMRS, and user data, which in this example is URLLC PDSCH+PDSCH DMRS. Although FIG. 4 illustrates an original transmission and three repetitions, the transmission can include a more or fewer repetitions than what is illustrated. The spacing between the original transmission and the first repetition, as well as the spacing between repetitions can be f, which can be greater than or equal to zero. In other words, although a time gap is illustrated in this Figure, the original transmission 405 and repetitions 410a-410n can be directly adjacent to each other in time.

Figure 5:
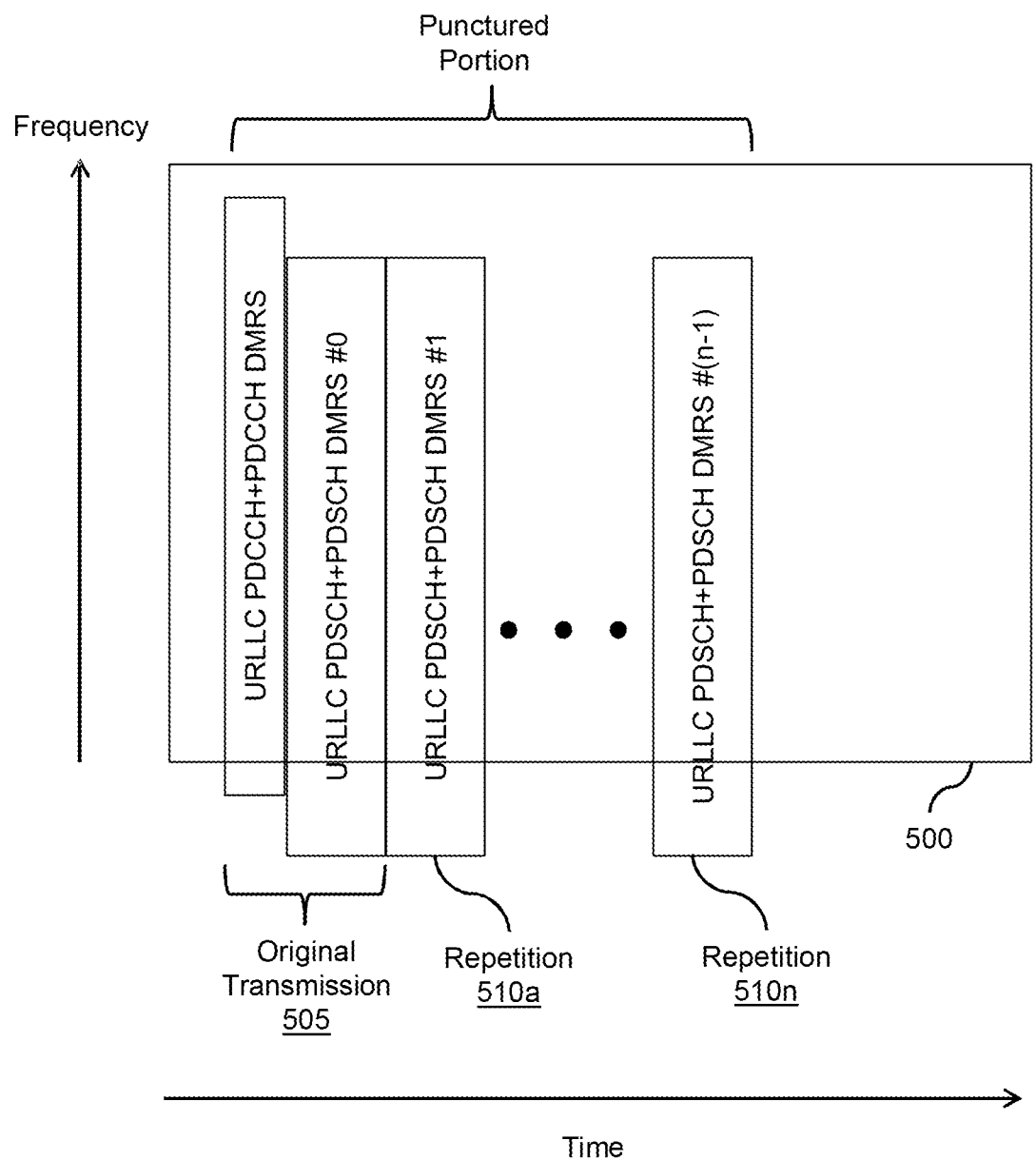
FIG. 5 is a block diagram of a punctured transmission with a single control data transmission and repeated user data transmissions without frequency hopping in accordance with exemplary embodiments of the present disclosure.

The transmission in FIG. 5 is a single TTI 500 for the second service, which does not have strict latency requirements, punctured by data for the first service, which has strict latency requirements. In this example the original transmission 505 includes both control data, which in this example is URLLC PDCCH+PDCCH DMRS, and user data, which in this example is URLLC PDSCH+PDSCH DMRS. In contrast to the example of FIG. 4, in the example of FIG. 5 the control data is not retransmitted and only the user data is retransmitted 510a-510n. Further, the original transmission and repetitions are directly adjacent to each other in time and in the frequency the original transmission and repetitions do not occupy all of the frequency resources at a particular time within the TTI 500 and extends outside of the frequency resources used for the TTI 500.

Figure 6:
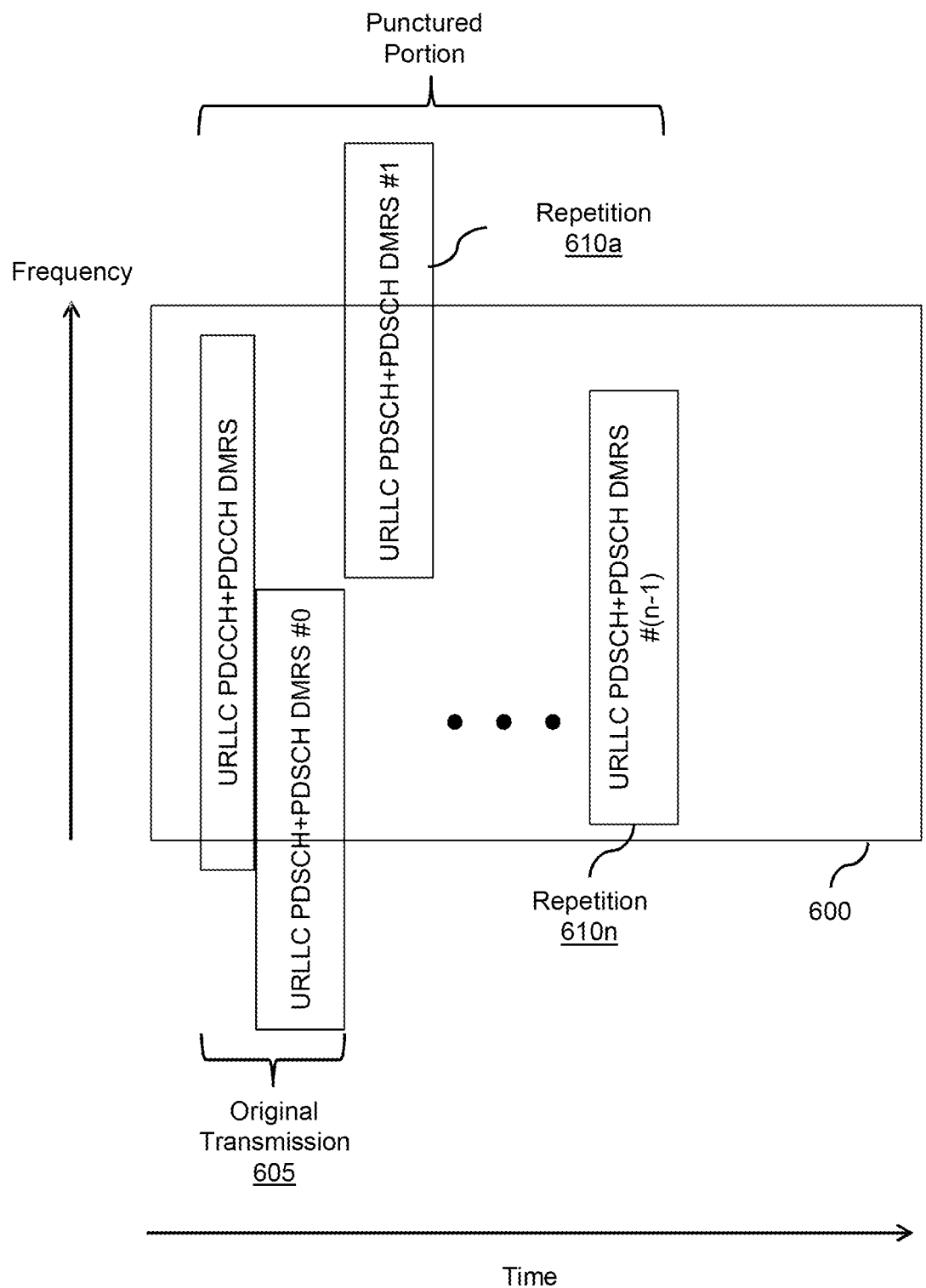
FIG. 6 is a block diagram of a punctured transmission with a single control data transmission and repeated user data transmissions with frequency hopping in accordance with exemplary embodiments of the present disclosure.

The example in FIG. 5 does not employ frequency hopping for the transmission for the first service. In contrast, the example in FIG. 6 employs frequency hopping for the first service. Otherwise, the example of FIG. 6 is the same as that of FIG. 5, i.e., the original control data is not retransmitted but the user data is and the original transmission and repetitions are directly adjacent to each other so that there is only a single punctured portion. Thus, in FIG. 6 the TTI 600 for the second service includes a single punctured portion having the original transmission 605 and one or more repetitions 610a-610n. Activating or deactivating frequency hopping can be configured by a higher layer parameter or carried by a field in the Downlink Control Information (DCI), which is carried by the PDCCH of the first service.

Figure 7:
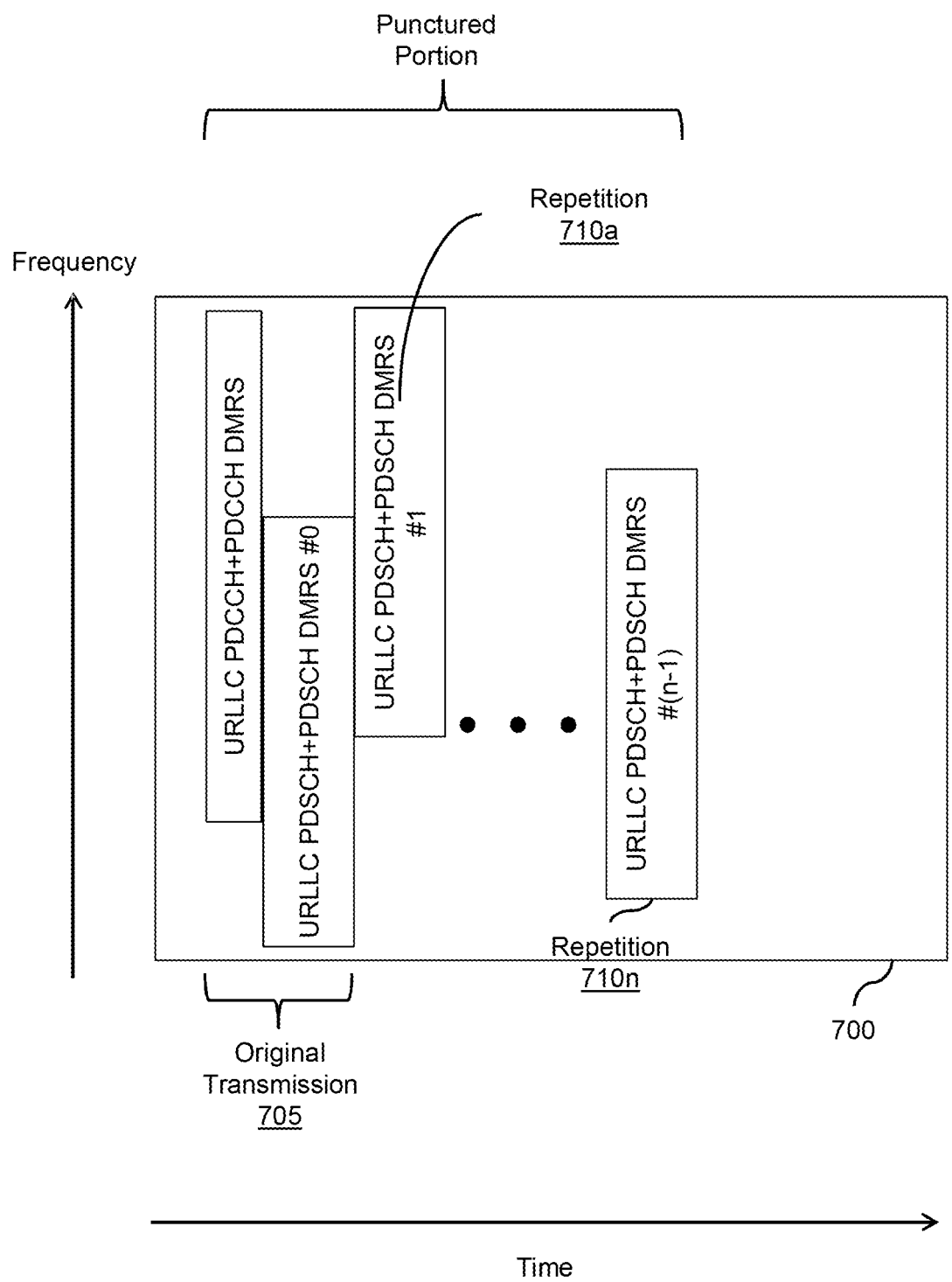
FIG. 7 is a block diagram of another punctured transmission with a single control data transmission and repeated user data transmissions with frequency hopping in accordance with exemplary embodiments of the present disclosure.

The transmission in FIG. 7, like the example in FIG. 6, employs frequency hopping, and like the examples in both FIGS. 5 and 6 the original control data is not retransmitted but the user data is and the original transmission and repetitions are directly adjacent to each other so that there is only a single punctured portion. However, in this example the original transmission 705 and the one or more repetitions 710a-710n are contained within the frequency resources allocated to the TTI 700.

Although FIGS. 4-7 illustrate the usage of particular time-frequency resources for the punctured data, other time-frequency resources can be used. In the example of FIG. 4, the redundant transmissions can all be directly adjacent to one another in time and directly adjacent to the originally transmitted data instead of interleaving data for the second service between the redundant transmissions. In the examples of FIGS. 5-7 the original and redundant transmission for the low latency service can be interleaved in time with transmissions for the second service similar to the illustration in FIG. 4.

Furthermore, the number of redundant transmissions can deviate from the illustrated examples and the present disclosure can be implemented using a fewer or greater number of redundant transmissions. Finally, the particular amount of time resources and/or frequency resources used for the original transmission and the repetitions for the low latency service can be greater or less than what is illustrated in FIGS. 4-7.

Figure 1:
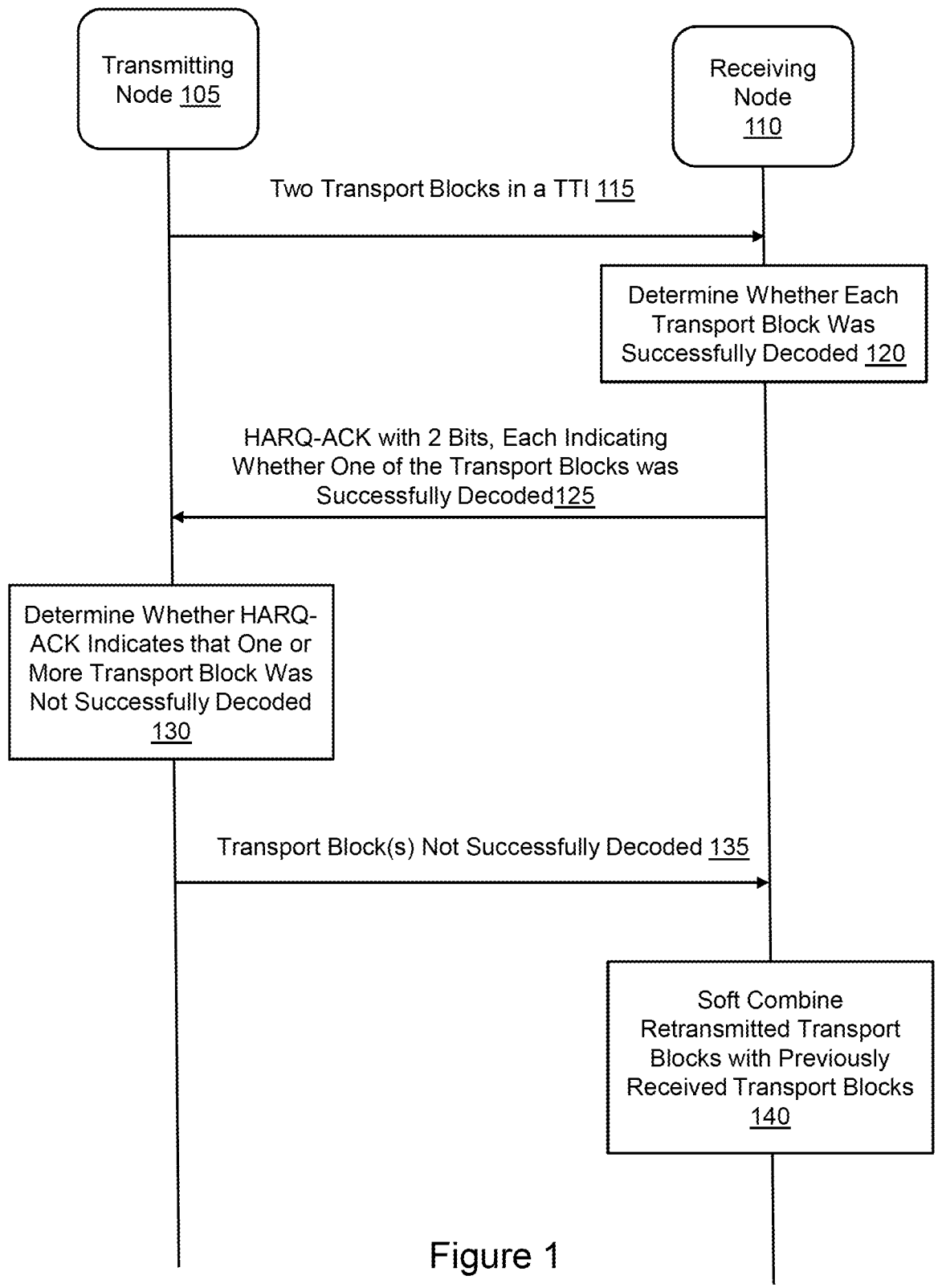
FIG. 1 is a signaling diagram of a conventional HARQ process.
Figure 2:
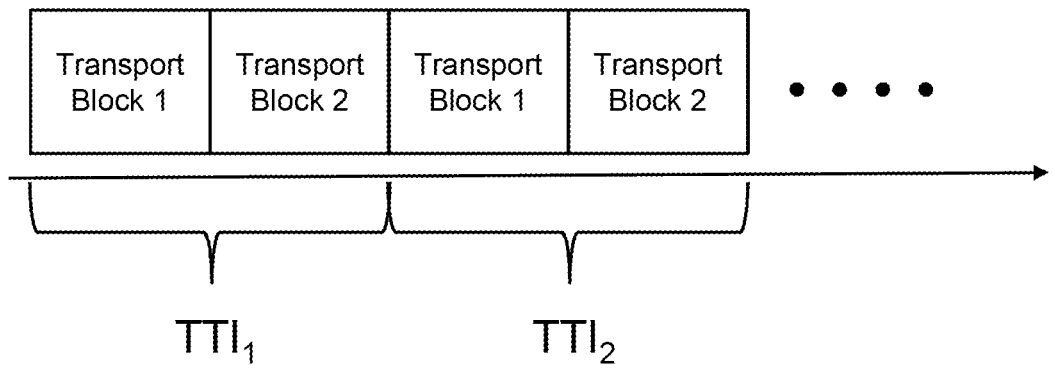
FIG. 2 is a block diagram of conventional transport block transmissions.
Figure 8:
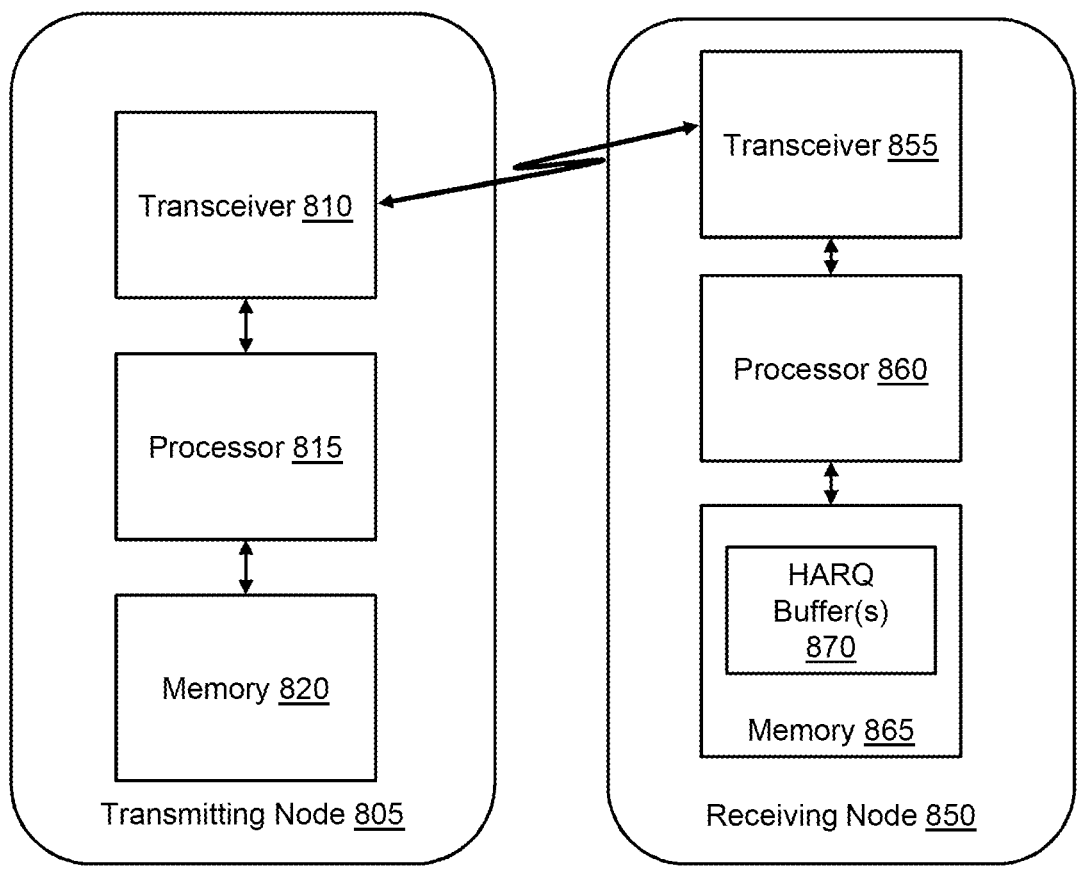
FIG. 8 is a block diagram of a transmitter and receiver in accordance with exemplary embodiments of the present disclosure.

Prior to describing the details of the methods performed by a transmitting and receiving node to support the puncturing illustrated in FIGS. 4-7, a high-level description of an exemplary transmitting node and receiving node will be presented in connection with FIG. 8 to assist the reader in understanding the details of the implementation of the processes of the present disclosure that follows. As illustrated, a transmitting node 805 can transmit information to a receiving node 850, and the receiving node 850 can transmit information to the transmitting node 805. In order to accomplish this, the transmitting node 805 includes a processor 815 coupled to a transceiver 810 and memory 820; and the receiving node 850 includes a processor 860 coupled to a transceiver 855 and memory 865. Transceivers 810 and 855 respectively provide the transmitting node 805 and the receiving node 850 with a wireless interface. Processors 815 and 860 can be any type of processor, such as a microprocessor, application specific integrated circuit (ASIC), field programmable gate array (FPGA), and/or the like.

Memory 865 includes a HARQ buffer 870, which is used to store different transmissions for soft combining. Memory 820 and 865 can be any type of memory and can include both transitory and non-transitory memory. The non-transitory memory can include code, which when executed by the associated processor, causes the processor to perform the methods described herein. The non-transitory memory can include a computer-readable medium storing the code. Although FIG. 8 illustrates the use of transceivers, separate transmitters and receivers can be provided, depending upon implementation. FIG. 8 is a high-level illustration of a transmitting node 805 and receiving node 850 and those skilled in the art will recognize that each can include additional components, such as input devices, interfaces to other devices, one or more antennas, one or more displays, etc.

Although the discussion below assumes the transmitting node 805 is a base station (e.g., an eNB, a gNB, or any other type of base station) and the receiving node 850 is a UE (user equipment), the disclosure can also be employed where the transmitting node 805 is a UE and the receiving node 850 is a base station. In this case the transmission of the data for the first and second services involves transmissions from at least two UEs, i.e., one of the UEs transmits data for the first service and another UE or a plurality of other UEs transmit data for the second service during the TTI. The transmission by the one UE of data for the first service can be coordinated with the transmissions by the other UEs for the second service so that there is no, or minimal, overlap in time and/or frequency. Uncoordinated transmission can also be employed so that the transmission by the one UE of data for the first service overlaps in time and/or frequency with transmission by at least one of the other UEs.

Figure 9:
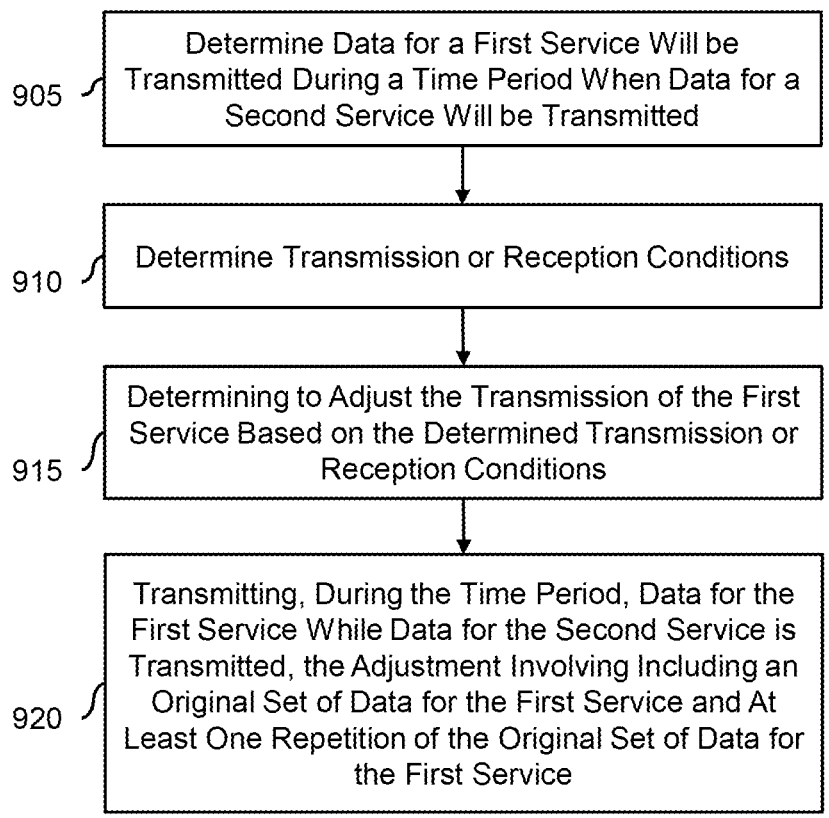
FIG. 9 is a high-level flow diagram of an exemplary transmission method in accordance with exemplary embodiments of the present disclosure.
Figure 10:
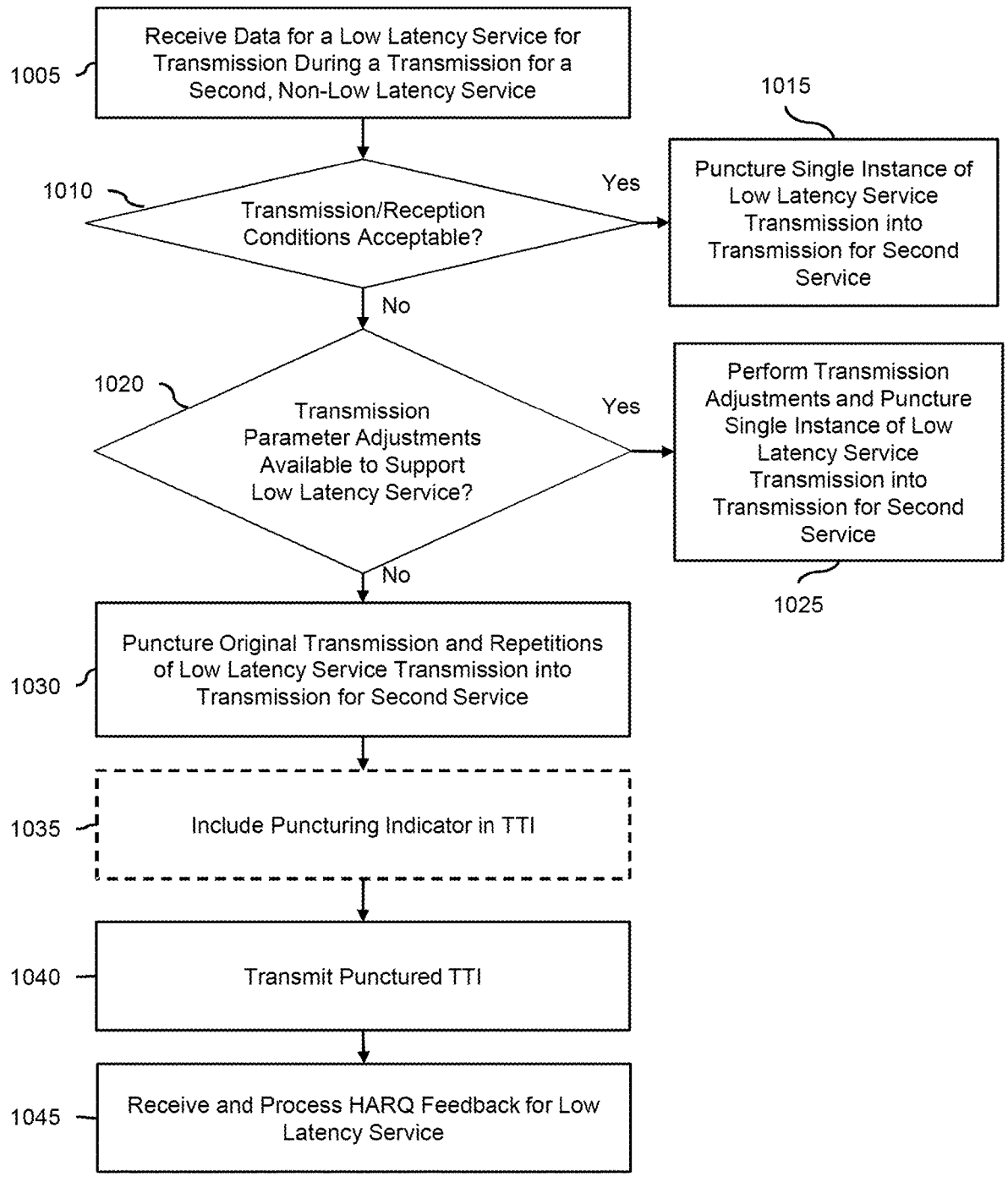
FIG. 10 is a flow diagram of an exemplary transmission method in accordance with exemplary embodiments of the present disclosure.

A method performed by a transmitting node 805 will first be presented in connection with the high-level flow chart of FIG. 9, and then the details will be addressed in connection with the description of FIG. 10. Initially the transmitting node 805 determines that data for a first service will be transmitted during a time period when data for a second service will be transmitted, where data for the first service requires lower latency than data for the second service (step 905). The transmitting node 805 then determines transmission or reception conditions (step 910) and based on the determined transmission or reception conditions determines to adjust the transmission of the first service (step 915). As discussed in detail below, these adjustments can be adjusting transmission power, modulation, and/or coding, as well as employing puncture bundling. For purposes of explanation only, it will be assumed in this example that the transmission adjustment includes at least the use of puncture bundling. Accordingly, the transmitting node 805 transmits, during the time period, data for the first service while data for the second service is transmitted, and the adjustment involves including an original set of data for the first service and at least one repetition of the original set of data for the first service (step 920).

Turning now to the flowchart of FIG. 10, the processor 815 of the transmitting node 805 initially, via the transceiver 810, receives data for a low latency service for transmission during a time period for transmission of data for a second, non-low latency service (step 1005). The processor 815 of transmitting node 805 then determines whether the transmission and/or reception conditions are acceptable (step 1010). This determination can be based on any number of factors, including Signal-to-Noise Ratio (SNR), Signal-to-Interference Ratio (SIR), Block Error Rate (BLER), etc. Further, information used for making this determination can be obtained using conventional feedback techniques for reporting transmission/reception conditions to the transmitting node.

If processor 815 determines the conditions are acceptable ("Yes" path out of decision step 1010), then processor punctures the second transmission with a single instance of the data for the low latency service and transmits the data for both the first and second services using transceiver 810 (step 1015). This puncturing can take a form similar to what is illustrated in FIGS. 3A and 3B (depending upon whether the transmitting node is a base station or UE). The puncturing does not have to occupy the same time and/or frequency resources illustrated in FIGS. 3A and 3B and the data for the first service punctured into the data for the second service in different time and/or frequency locations than what is illustrated in FIGS. 3A and 3B. The significance of this transmission is that it does not include any redundancy for the data of the first service in the transmission. Further, as discussed above, if the transmitting node is a base station then there will be minimal or no overlap between the data being transmitted for the first and second services, whereas if the transmitting node is a UE there may be overlap in time and/or frequency.

If the processor 815 of transmitting node 805 determines the transmission and/or reception conditions are not acceptable ("No" path out of decision step 1010), then processor 815 determines whether transmission adjustments are available to support the low latency service (step 1020). Transmission adjustments can include increasing transmission power, changing modulation and/or coding, etc. If there are transmission parameter adjustments available ("Yes" path out of decision step 1020) then the transmitting node transmits the data for the low latency service punctured in the transmission of the data for the second service using the adjusted transmission parameters via transceiver 810 (step 1025).

Situations can occur where the transmitting node 805 is already transmitting at maximum power or has already employed the most robust modulation and/or coding, and thus transmission adjustments would not be available. These situations can occur, for example, when the UE is at the edge of the base station's cell, when coverage is spotty due to the use of high frequencies, and when there is unwanted interference. In these and other similar situations no transmission adjustments are available but due to the strict latency requirements of the first service it is still necessary for the transmitting node to attempt to provide this data to the receiving node 850, which in the present disclosure is achieved by transmitting the original data for the first service and one or more redundant versions of the original data for the first service in a single transmission, e.g., a single TTI of the second service.

If transmission parameter adjustments are not available to support the low latency service ("No" path out of decision step 1020), then processor 815 decides to transmit the data for the first service using puncture bundling. Specifically, the processor 815 punctures the original transmission and one or more repetitions of the original transmission for the first service into a transmission for the second service (step 1030). This can be achieved using any of the examples discussed above in connection with FIGS. 4-7, as well as variations thereof. Thus, depending upon implementation, the one or more repetitions may contain both the control data and user data or can contain only the user data.

According to exemplary embodiments the transmitting node 805 can explicitly signal the presence of the puncture bundling in the TTI, the receiving node 850 can perform blind detection, and/or the receiving node 850 can be preconfigured using separate signaling to facilitate blind detection.

The explicit indicator can be implemented in a variety of different ways. The explicit indicator can be a Puncturing Bundle Indicator (PBI) that is included in the transmission of the original data for the first service but not in the repetitions for the first service. This allows the receiving node to distinguish between the transmission of the original data for the first service from the repetitions so that the receiving node can perform soft combining using the transmission of the original data and one or more of the repetitions. Alternatively, the PBI can be sent from a control channel, which can be carried in a mini-slot. The PBI can also carry information on the next punctured resource blocks, such as time/OFDM symbol/slot offset, PRB-(Physical Resource Block) offset, or sequences of such information for each puncture bundle transmission to assist the receiving node to find the received transmissions for the first service.

The explicit indicator can also include information about the size of the punctured data for the first service, i.e., the size of the data for the original transmission for the first service and all of the repetitions within a TTI for the second service. This size information, referred to herein as PUNC-TURE_BUNDLE_SIZE, can be calculated based on the transport block (TB) size of the transmission for the second service, the URLLC transport block size, channel conditions, etc. The PUNCTURE_BUNDLE_SIZE can be equal to the amount of the original transmission for the first service and the repetitions, which in the example of FIG. 4 would be 4. Thus, the original transmission of the data for the first service and the repetitions resulting from a single Radio Link Control (RLC) Service Data Unit (SDU) are transmitted consecutively in the same TTI for the second service and has a HARQ process number 0.

The explicit indicator can further comprise information informing the receiving node 850 of how the data for the first service was punctured into the TTI of the second service, coding schemes of the transmission of the original data for the first service and the repetitions, and size information similar to the PUNCTURE_BUNDLE_SIZE information. This information, referred to herein as a punctureBundlingField. In one embodiment this information can be included in both the original transmission of the data for the first service and the repetitions to handle problems with misdetection of the puncture indicator, such as when the original transmission of the data for the first service and/or one or more of the repetitions were not received by the receiving node 850, and thus the receiving node 850 cannot rely upon the amount of the original transmission and repetitions. Thus, for example, if receiving node 850 did not receive the original transmission of the data for the first service and the first repetition but has detected the second repetition, the receiving node 850 can decode the second repetition and any further repetition (in which case soft combining can be performed). Further, the receiving node 850 can examine portions of the transmission received earlier to try to decode the original transmission of data for the first service and the first repetition.

The PBI can be used by itself, in combination with the PUNCTURE_BUNDLE_SIZE, in combination with the PUNCTURE_BUNDLE_SIZE and the punctureBundlingField, as well as in combination with any information related to puncturing, punctured areas, and/or coding schemes.

In addition or as an alternative to providing an explicit indicator, the transmitting node 805 can configure the receiving node 850, for example via Radio Resource Control (RRC) message, a MAC (Medium Access Control) CE (Control Element), or other similar messaging, to preconfigure the semi-static regulation of the next transmitted resources, such as the resources using the same PRB and the earliest possible OFDM symbols, etc. Alternatively or additionally, this messaging can initially preconfigure the frequency hopping pattern and the PBI can correspond to a frequency hopping pattern index or can revoke the frequency hopping.

Blind detection of the puncture bundling can be implemented in a way to increase the ability of the receiving node 850 to recognize the puncture bundling. For example, the transmission of the original data for the first service and each of the repetition can employ the same redundancy version, i.e., each are coded in the same manner, within a predefined time window. Thus, the processor 860 of receiving node 850 can detect the puncture bundling by the sequence of QAM (Quadrature Amplitude Modulation) symbols of the original transmission for the first data service and the repetitions having the same signal values after channel equalization. Thus, the punctured area includes a repetitive pattern so the processor 860 of the receiving node 850 can perform correlation based on signal processing to estimate the presence of a puncture bundled transmission in terms of transport block lengths and bundling number within a predefined time window, such as a sub-frame slot of the second service. Another advantage to using the same redundancy versions for the transmission of the original data for the first service and the one or more repetitions is that the signal can be combined at the QAM symbol level, which reduces receiving complexity while also achieving the bundling gain.

The assisted blind detection can provide the receiving node 850 with reconfiguration information to specify parts or almost all of the bundling parameters that can be used. The reconfiguration information is sent separately from the transmission of the data for the first service, such as in a Radio Resource Control (RRC) message or other L1/L2 (layer 1 or layer 2) signaling message. Notification of the potential presence of puncture bundling can be achieved by transmitting a semi-persistent change instruction to receiving nodes 850 that are using the first service.

Returning to FIG. 10, if an explicit indicator is employed then it is included in the punctured TTI in the manner described above (step 1035). If an explicit indicator is not supported this step is omitted. Processor 815 of transmitting node 805 then transmits the punctured TTI using transceiver 810 to receiving node 850 (step 1040). The transmission of the punctured TTI will vary depending upon whether the transmitting node 805 is a base station or a UE. When the transmitting node 805 is the base station, the transmission of the TTI can include data for both the first and second services. Although the same could occur when the transmitting node 805 is a UE, the more likely scenario is the UE transmits only the data for the first service and one or more other UEs transmit the data for the second service, all of which occur during a TTI of the second service.

At some point after the receiving node 850 receives and attempts to decode the TTI the receiving node 850 will transmit HARQ feedback, i.e., an ACK or NACK, for the first service (step 1045) to the transmitting node 805. According to exemplary embodiments the HARQ feedback is a single message for the puncture bundle, i.e., the transmission of the original data for the first service and all repetitions within the puncture bundle. In contrast, conventional HARQ techniques involve separate HARQ feedback for the originally transmitted data and each repetition. Thus, the puncture bundling of the present disclosure not only helps achieve the strict latency requirements of the first service but also reduces overhead signaling by eliminating at least one, and possibly more depending upon the number of repetitions in a puncture bundle, HARQ feedback transmission. The reduced signaling increases air interface efficiency by reducing the number of radio resources consumed to support HARQ, as well as reduces interference that may be caused by the additional HARQ feedback transmissions.

Figure 11:
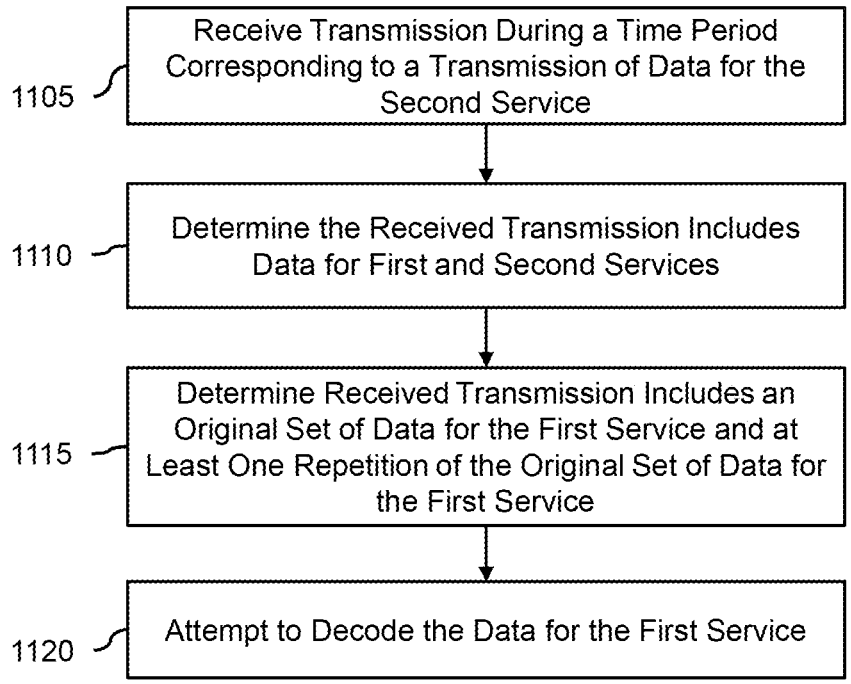
FIG. 11 is a high-level flow diagram of an exemplary reception method in accordance with exemplary embodiments of the present disclosure.
Figure 12:
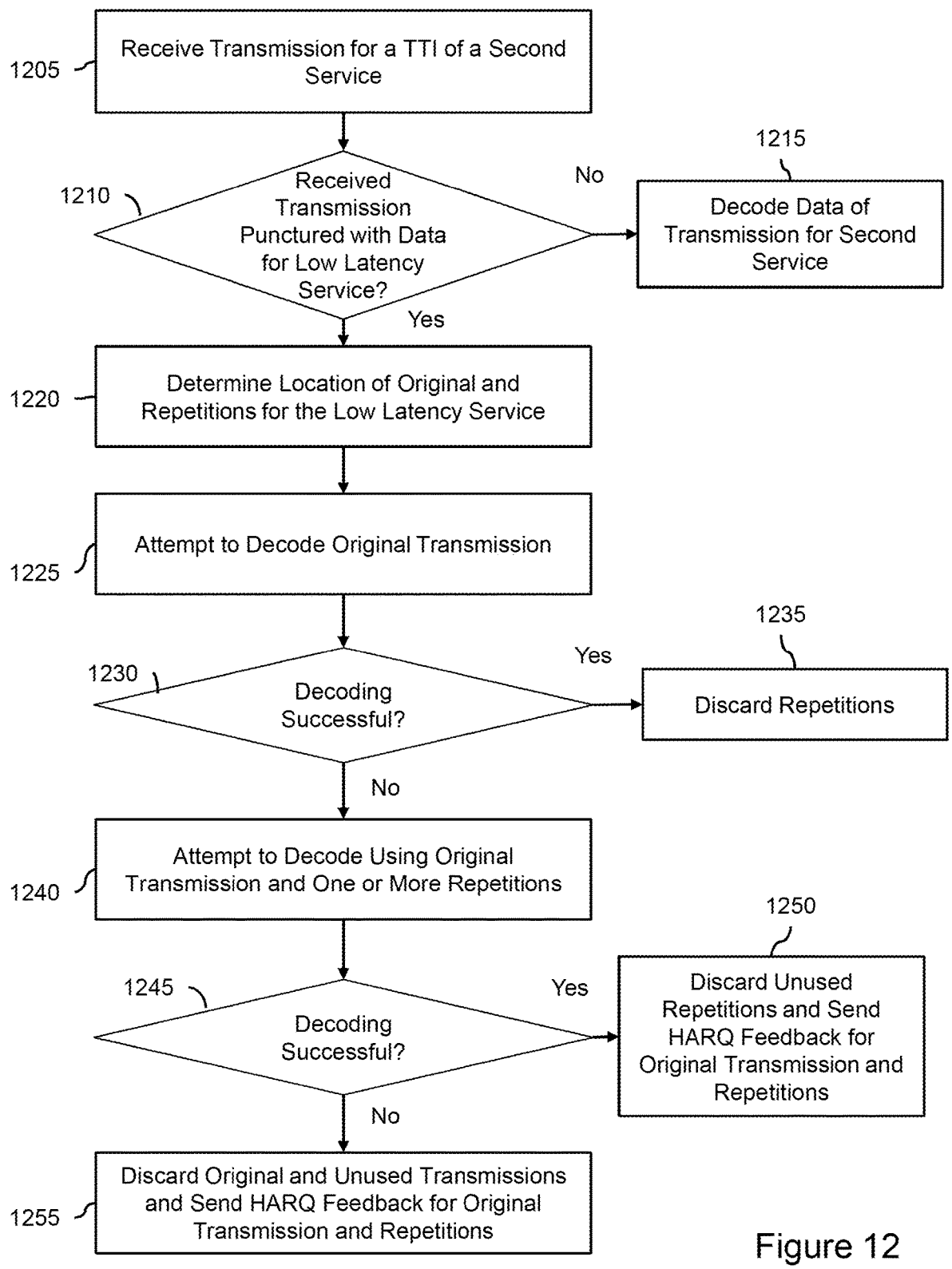
FIG. 12 is a flow diagram of an exemplary reception method in accordance with exemplary embodiments of the present disclosure.

A method performed by a receiving node 850 will first be presented in connection with the high-level flow chart of FIG. 11, and then the details will be addressed in connection with the description of FIG. 12. Initially the receiving node 850 receives a transmission during a time period corresponding to a transmission of data for the second service (step 1105) and determines the received transmission includes data for the first and second services (step 1110). The receiving node 850 then determines the received transmission includes an original set of data for the first service and at least one repetition of the original set of data for the first service (step 1115) and the receiving node attempts to decode the data for the first service using the original set of data alone or in combination with one or more repetition of the at least one repetition of the original set of data for the first service (step 1120).

Turning now to FIG. 12, the processor 860 of receiving node 850 initially receives, via transceiver 855, a transmission of a TTI for the second service (step 1205). The processor 850 then determines whether the received transmission was punctured with data for the first service (step 1210). This determination can be performed in a number of different ways. For example, a CRC (Cyclic Redundancy Check) bitmap can be used to indicate code blocks transmitted after the punctured part, such that in one example a CRC=00000 is used for code blocks preceding a punctured code block and a CRC=01000 can be used to indicate code blocks following a punctured code block. In another example the transmitting node 805 can provide a blanking assignment to the receiving node 850, such as assigning the transmission for the first service using the DCI with a CRC bitmap matching the RNTI (Radio Network Temporary Identity) of the intended receiving node 850 for the scheduled URLLC transmission. The transmitting node 805 could also include a blanking indicator in the TTI, which indicates that at least a portion of the time-frequency resources for the second transmission is punctured. For example, the receiving node 850 can be configured via an RRC message to detect puncturing if a specific reference signal is detected, for example an URLLC PDCCH DMRS. In yet another example the receiving node 850 can blindly detect the presence of punctured data, such as by comparing two separate transmissions of the second service in order to generate a hypothesis of which of the separate transmissions were punctured.

If the processor 860 determines there is no puncturing of the TTI for the second service ("No" path out of decision step 1210), then processor 860 attempts to decode the data of the transmission for the second service (step 1215). If the processor 860 determines there is puncturing ("Yes" path out of decision step 1215), then processor 860 determines the location of the transmission of the original data for the first service and the repetitions (step 1220). The manner in which the receiving node 850 determines the location of the data for the first service depends upon whether the network implements an explicit indicator, blind detection, or assisted blind detection, each of which can be implemented in the manner described above.

The processor 860 of receiving node 850 then attempts to decode the original transmission of the data for the first service (step 1225). If the decoding was successful ("Yes" path out of decision step 1230), then the processor 860 discards the repetitions because they were not needed to decode the data for the first service (step 1235). Whether or not decoding is successful can be based on conventional techniques, such as by checking the CRC (Cyclic Redundancy Check).

If the decoding was not successful ("No" path out of decision step 1230), then the processor 860 attempts to decode using the transmission of the original data for the first service and one or more of the repetitions (step 1240). This can be an iterative process where the processor 860 first attempts to decode using the original data and a first repetition and if this is not successful the processor 860 attempts to decode using the original data and the first and second repetitions, etc. If the processor 860 successful decodes the data for the first service ("Yes" path out of decision step 1245), then the processor 860 discards any unused repetitions and sends a single HARQ feedback for the original transmission and the repetitions indicating successful decoding (step 1250). If the processor 860 did not successfully decode the data for the first service using the original transmission and all of the repetitions ("No" path out of decision step 1245), then the processor 860 discards the original transmission and repetitions and sends a single HARQ feedback for the original transmission and the repetitions indicating a decoding failure (step 1255). Depending upon implementation, the transmitting node 805 can attempt to retransmit the data for the first service, either as only the original data or along with one or more repetitions, assuming the retransmission can satisfy the strict latency requirements of the first service.

The discussion above addressed some aspects of puncture bundling, including a high-level overview of various configurations of puncture bundles. A more detailed discussion of configuring puncture bundles will now be presented in connection with FIGS. 13-19.

Figure 13:
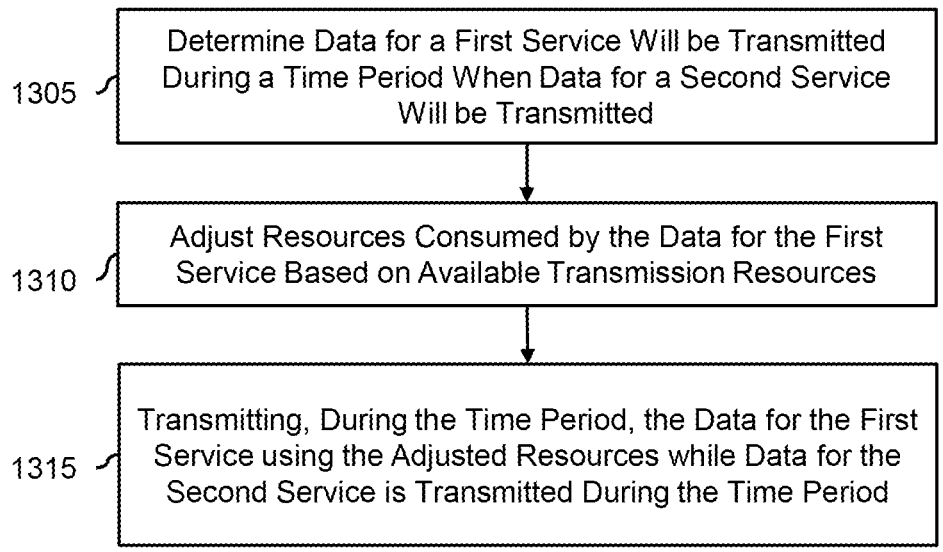
FIG. 13 is a high-level flow diagram of an exemplary transmission method in accordance with exemplary embodiments of the present disclosure.

FIG. 13 is a high-level flow diagram of an exemplary transmission method in accordance with exemplary embodiments of the present disclosure. Initially the processor 815 of the transmitting node 805 determines the data for the first service will be transmitted during a time period when data for a second service will be transmitted (step 1305). The data for the first service requires lower latency than the data for the second service and the data for the first service includes an original set of data for the first service and at least one repetition of the original set of data for the first service. The processor 815 then adjusts the resources consumed by the data for the first service based on available transmission resources (step 1310). As discussed in detail below, this adjustment can include filling-in the remaining resources of the TTI for the second service with the data for the first service or reducing the size of the puncture bundle, for example by including less than the number of repetitions of the original data than intended. The processor 815 then transmits, during the time period, the data for the first service using the adjusted resources while data for the second service is transmitted during the time period (step 1315).

Figure 14:
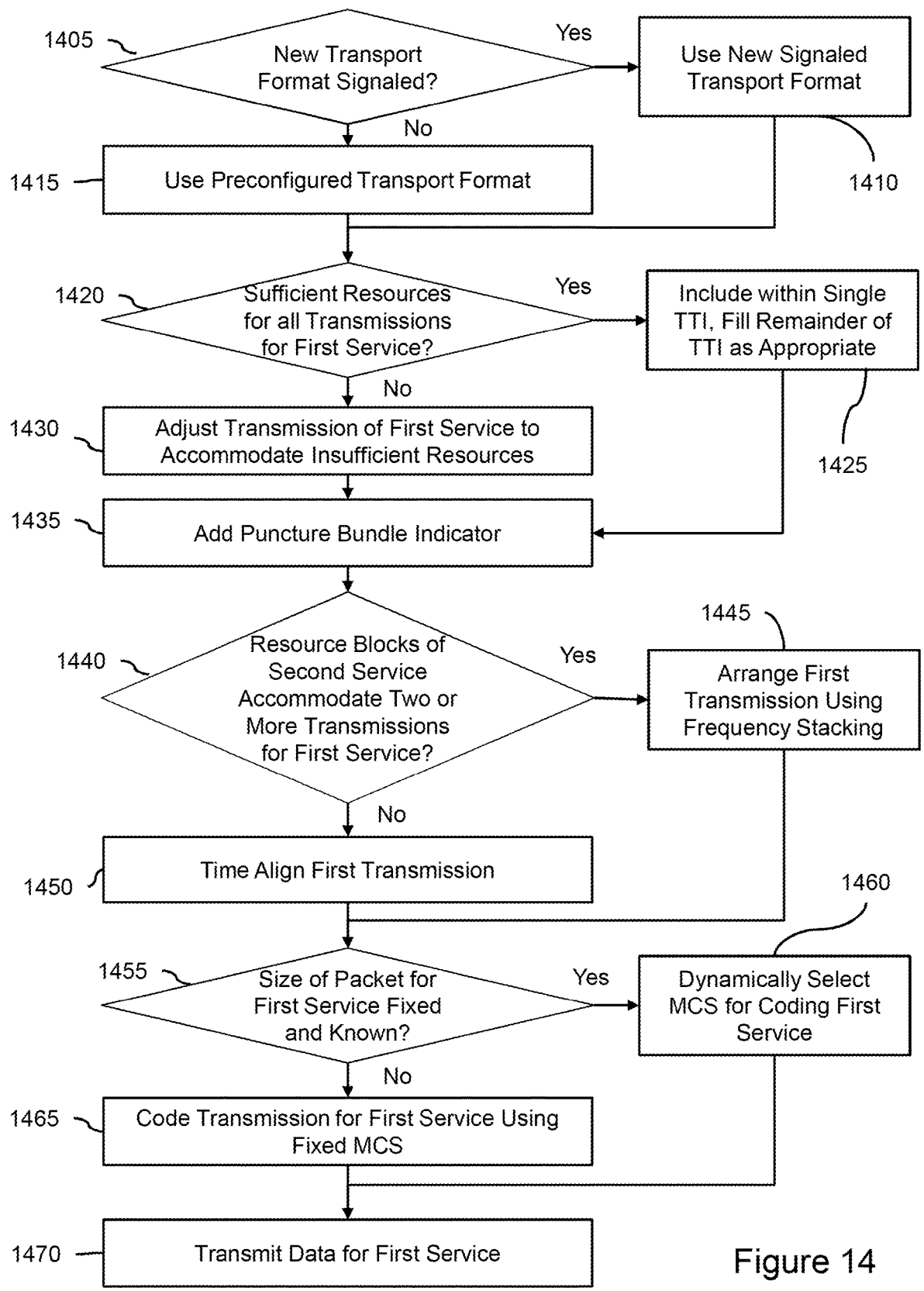
FIG. 14 is a flow diagram of an exemplary transmission method in accordance with exemplary embodiments of the present disclosure.

Turning now to FIG. 14, when the transmitting node 805 has data to transmit for the first service the processor 815 initially determines whether a new transport format is configured (step 1405). According to exemplary embodiments the physical layer transport format is preconfigured before the start of the transmission of data for the first service and is changed upon receipt of new transport format signaling. Accordingly, if a new transport format was signaled ("Yes" path out of decision step 1405), the transmitting node 805 uses the new transport format (step 1410). Otherwise the transmitting node 805 continues to use the preconfigured transport format (step 1415).

Once the transmitting node decides to use the new or preconfigured transport format, the processor 815 determines whether there are sufficient resources within the TTI for the second service to accommodate the data for the first service (step 1420). This may occur if the puncture bundle is to be transmitted in the later part of the TTI for the second transmission there may not be sufficient resources to accommodate both the original transmission and each of the repetitions of the original transmission for the first service. For example this can occur if each transmission for the first service occupies two symbols, the puncture bundling involves the original data and three repetitions (i.e., 4 mini-slots occupying 8 symbols), the TTI for the second service is 14 symbols, and the puncturing occurs after the $7^{th}$ symbol of the TTI, then the transmission for the first service occupies 8 symbols but at the point of insertion of the puncture bundle there would only be 7 symbols available.

Figure 15:
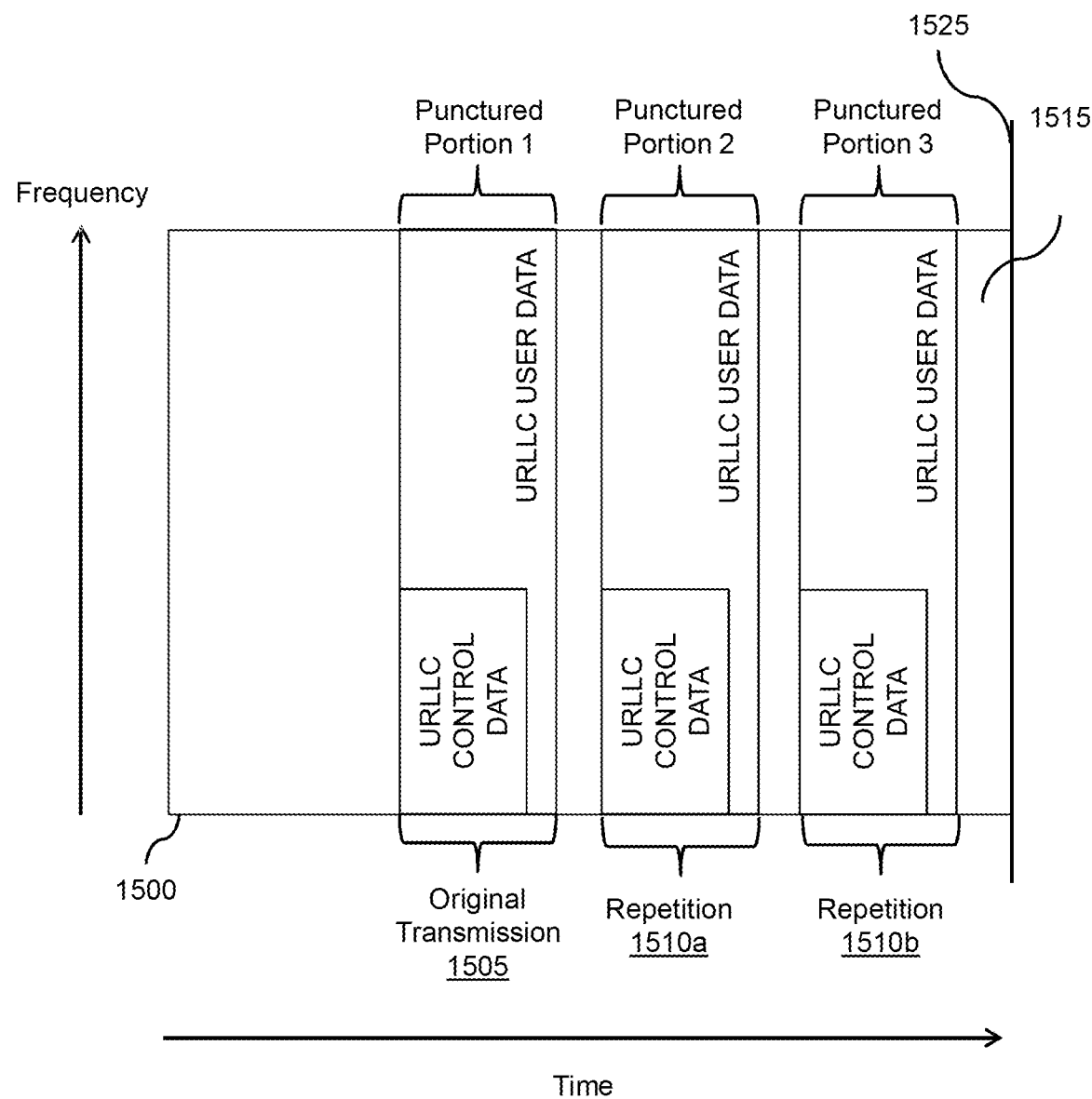
FIG. 15 is a block diagram of a punctured transmission with resources remaining at the end of the transmission time period of the second service in accordance with exemplary embodiments of the present disclosure.

If there are sufficient resources for all transmissions of the first service ("Yes" path out of decision step 1420), then the transmitting node will include all of the transmissions for the first service in the TTI for the second service (step 1425). Situations can also occur in which there are available resources following the puncture bundle, an example of which can be seen in FIG. 15. FIG. 15 illustrates that within a TTI 1500 of the second service, an original transmission for the first service 1505 and two repetitions 1510a, 1510b are punctured. In this example resource area 1515 represents a portion of the TTI for the second service between the end of the puncture bundle mini-slot. Depending upon implementation this resource area 1515 may not be large enough to accommodate data for the second service, and thus these resources could be entirely wasted.

One way to avoid this is to delay the starting point of the puncture bundle so that the end of the puncture bundle lines-up with the end of the slot boundary 1525 of the TTI 1500 for the second service. Another alternative can involve employing a lower coding rate for the repetition closest to the slot boundary 1525 so that this repetition fills the gaps. The Puncture Bundling Indicator discussed above can be used to explicitly indicate the coding format used for each original and repetition of the data for the first service. Yet another alternative is to shorten the length of the last repetition so that it fits within the remaining time of the TTI for the second service. For example, the last repetition for the first service can use a mini-slot length of one symbol instead of the two symbols used for the regular mini-slots. According to yet another alternative the mini-slot length can be increased for more than one of the original transmission and repetitions of the data for the first service. For example, if there are nine remaining OFDM symbols and the amount of the original transmission and the repetitions is three (i.e., one original transmission and two repetitions), then three OFDM symbols can be allocated each mini-slot.

Another alternative is to repeat one or more of the original transmission and/or the repetitions to fill the remaining resources in the TTI. For example, if there are resources sufficient for an amount equal to one original transmission and five repetitions but the data for the first service was initially configured for one original transmission and three repetitions, then two additional transmission can occur (which can include the original and/or one or more of the repetitions). If the original transmission and each of the repetitions are formatted and coded in the same manner than the two additional transmissions can be the same both the original transmission and the repetitions (e.g., RV0, RV0, RV0, RV0, RV0, RV0, RV0, RV0). If the original transmission and/or one or more of the repetitions are formatted or coded differently then two of the original and/or repetition can be repeated (e.g., RV0, RV1, RV2, RV3, RV0, RV1). Depending upon the formatting of the TTI for the second service, the added repetitions can be spared out in different areas of the TTI to accommodate sensitive information bits or control channels of the data for the second service. Further, each punctured area contains at least one RV (Redundancy Version) or an RVG (Redundancy Version Group), which might include one RV or more RVs. The RV(s) are typically associated with a transport block of the data for the first service. In rare situations in which the TBS (transport block size) is large, e.g., $TB_{SURLLC}>8192$ bit, and incurs code block segmentation, the repetition and the associated RV can be related with a CBG (Code Block Group).

Before returning to FIG. 14, it should be noted that the formatting of the data for the first service in FIG. 15 differs from the earlier illustrations in that in FIG. 15 the control data for the first service occupies only a portion of the frequency bandwidth of the TTI for the second service and the remaining portion of the frequency bandwidth is allocated for the corresponding user data for the first service. This formatting can also be employed with the embodiments discussed above.

Returning to FIG. 14, if there are insufficient resources for all transmissions for the first service ("No" path out of decision step 1420), then the processor 815 adjusts the transmission of the first service to accommodate the insufficient resources (step 1430). One way to adjust the transmission is to reduce the number of repetitions so that the total of the original transmission and the repetitions would be limited to n when n+1 would extend over the boundary of the TTI. The number n need not be preconfigured but can be dynamically extracted from the starting point of the puncturing (puncture bundling start-mini-slot), the end location of the mini-slot (puncture bundling end-mini-slot), and the duration of the mini-slot transmission, all of which can be included in the Puncture Bundle Indicator.

When the receiving node 850 is unable to successfully decode the data for the first service due to the reduced amount of transmissions and repetition of the data for the first service (e.g., when the available resources only allow for an original transmission and one repetition), the remaining repetition can be scheduled in granted-based manner (i.e., the normal HARQ procedure) to allow for successful decoding. Grant-based scheduling can also be employed if the original transmission and/or one or more of the repetitions was corrupted or missing (e.g., in contention-based puncturing of resources).

Once the transmission of the data for the first service is formatted for the available resources (step 1425 or 1430), the processor 815 adds the Puncture Bundle Indicator (step 1435). As discussed above, the Puncture Bundle Indicator can include a value for puncture bundling start-mini-slot to identify the starting point of the puncturing and a value for puncture bundling end-mini-slot to identify, the end location of the mini-slot. The Puncture Bundle Indicator and also include a value for punctured eMBB area ID start-mini-slot, punctured eMBB area-ID end-mini-slot, and the duration of the mini-slot duration, which allows for separately identifying the puncturing occurring within a TTI of the second service and puncturing occurring over more than one TTI. Separately identifying the start and end of the puncture bundling mini-slot and the punctured eMBB area mini-slot is useful when there are multiple punctured TTIs for the second service. An example of this will now be described in connection with FIG. 16.

Figure 16:
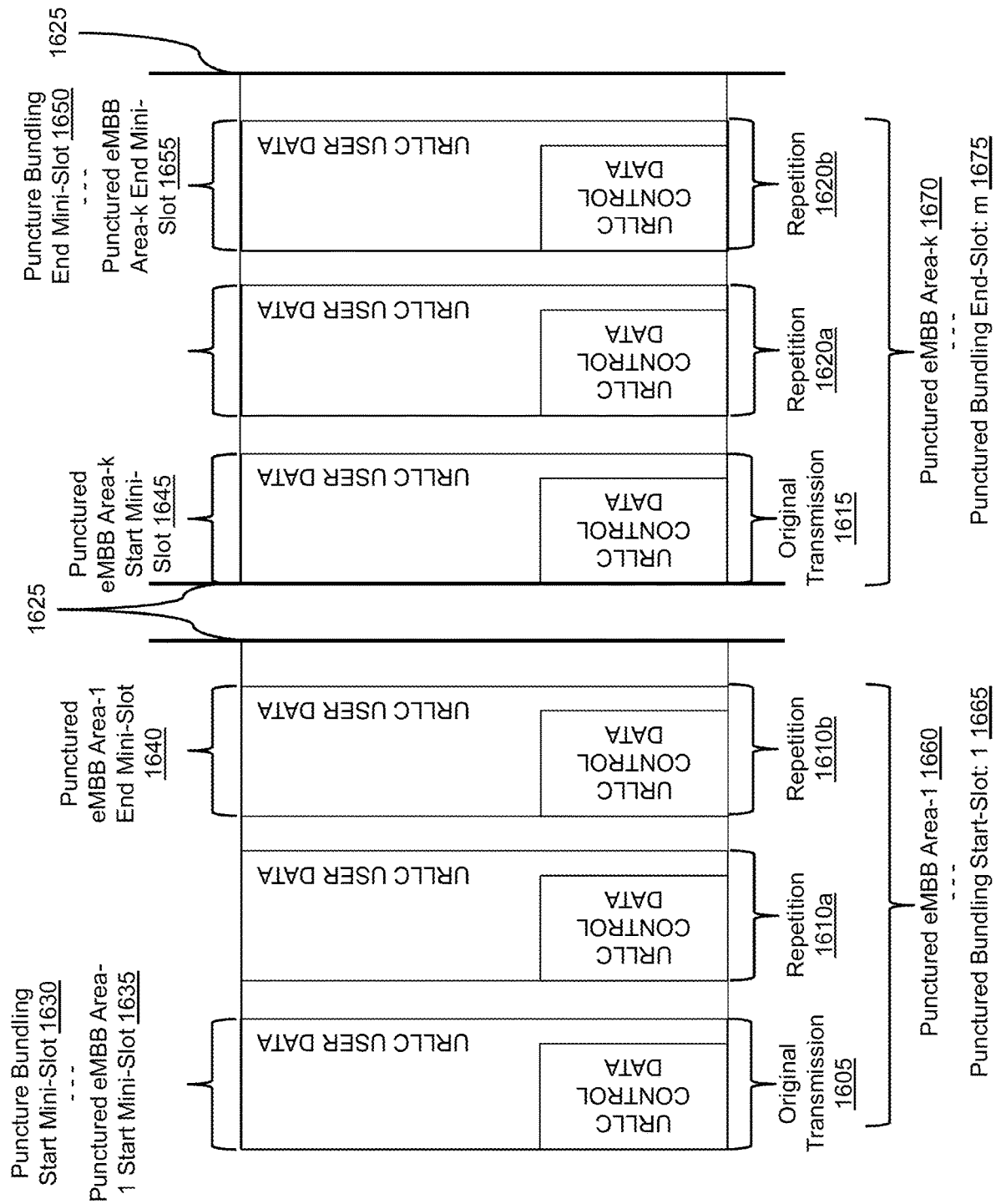
FIG. 16 is a block diagram of a punctured transmission spanning two transmission intervals for the second service in accordance with exemplary embodiments of the present disclosure.

In FIG. 16 the boundaries of the TTIs for the second service (also referred to as slot boundaries) are labeled 1625. Thus, FIG. 16 illustrates a first TTI (i.e., the first slot) including an original transmission of data for the first service 1605 and two repetitions of data for the first service 1610a, 1610b, and a second TTI (i.e., the mth slot) including an original transmission of data for the first service 1615 and two repetitions 1620a, 1620b. As illustrated, the first TTI for the second service is designated as punctured eMBB area-1 1660 and also as the punctured bundling start-slot: 1 1665 and the final punctured TTI for the second service is designated as punctured eMBB area-k 1660 and punctured bundling end-slot m 1675. Thus, the start and end of the puncture bundling slot covers more than one TTI, whereas each punctured eMBB area corresponds to a TTI. Accordingly, the beginning of the original transmission 1605 in the first TTI corresponds to the puncture bundling start mini-slot 1630 and the end of the last repetition 1620b corresponds to the puncture bundling end mini-slot 1650. In contrast, the punctured eMBB area-1 start mini-slot 1635 and the punctured eMBB area-1 end mini-slot 1640 define the punctured area within the first TTI and the punctured eMBB area-k start mini-slot 1645 and the punctured eMBB area-k end mini-slot 1655 define the punctured area within the second TTI. In other words, the puncture bundling start/end mini-slot is defined for the first service and the punctured eMBB area-1 start/end mini-slot is defined for the second service. Because there could be multiple punctured areas in one slot, the punctured bundling end-slot number m could be less than the area ID k.

Figure 17:
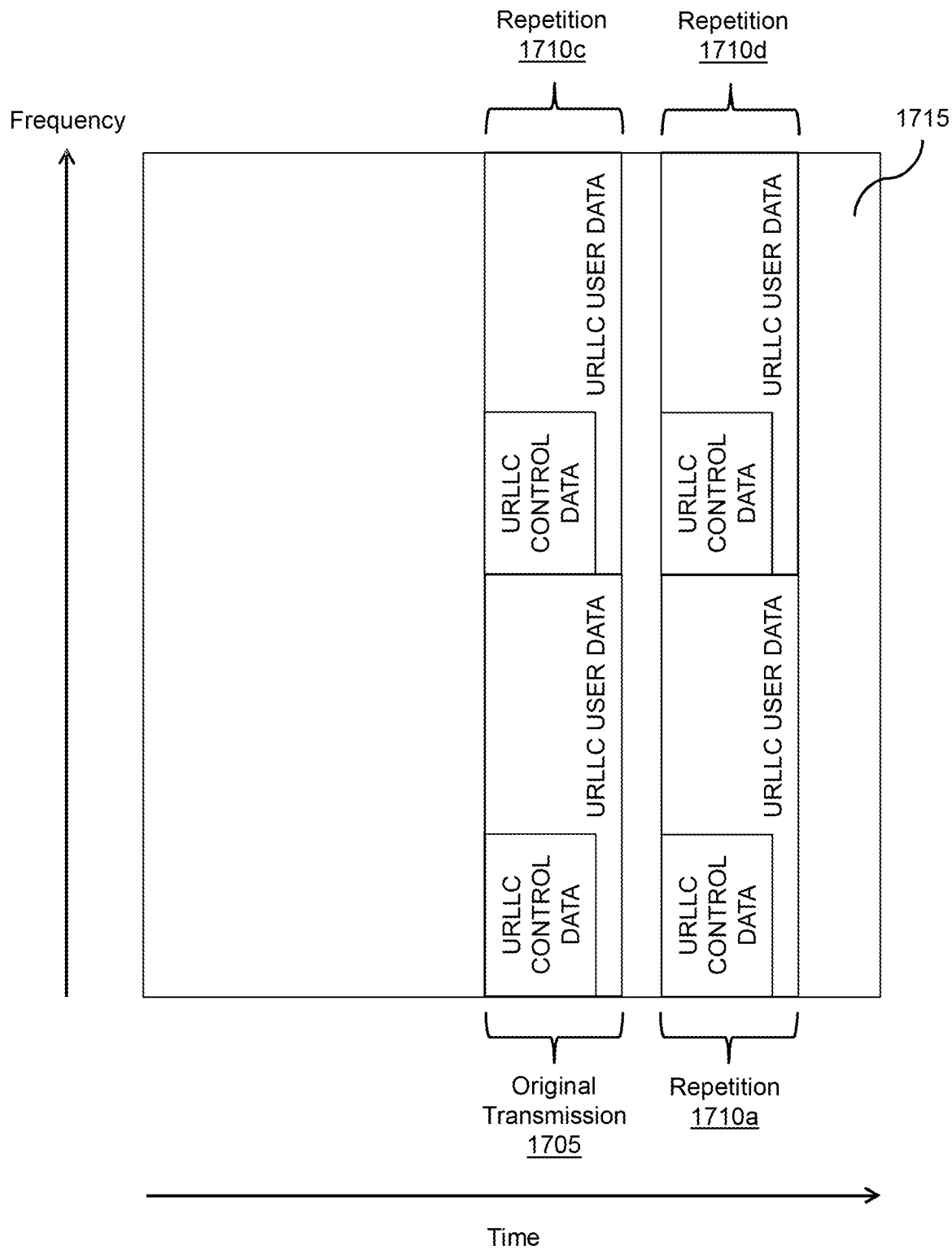
FIG. 17 is a block diagram of a frequency stacked punctured transmission in accordance with exemplary embodiments of the present disclosure.

Returning again to FIG. 14, after adding the Puncture Bundle Indicator (step 1435), the processor 815 of the transmitting node 805 determines whether the resource blocks of the second service are large enough to accommodate two or more transmissions for the first service (step 1440). If the resource blocks are large enough ("Yes" path out of decision step 1440), then the original transmission of data for the first service and the one or more repetitions can be frequency stacked (step 1445). FIG. 17 illustrates an exemplary frequency stacking in which an original transmission 1705 and one repetition 1710c are aligned in time and stacked in frequency and two repetitions 1710a and 1710d are aligned in time and stacked in frequency within the TTI of the second service. The area 1715 with unused resources for the first service can be occupied by the data for the first service using any of the adjustment techniques described above.

The particular arrangement of the original transmission and the repetitions can be preconfigured, for example in RVGs such as beginning from lower to higher frequency and then in time. Due to the limited power of the UE, frequency domain stacking will typically be implemented only in the downlink from the base station to the UE. Moreover, in the uplink a power splitting in the frequency domain by frequency stacking may not substantially outperform a non-frequency stacked transmission, and accordingly for in the uplink repetitive transmissions over time may be more beneficially to quality enhancement for the uplink.

The frequency stacking illustrated in FIG. 17 is merely exemplary and other variations are within the scope of the disclosure. For example, uplink and downlink transmissions can be frequency stacked and/or the transmission of control data can be frequency stacked with the transmission of user data.

One variation of the frequency stacking is to encode the data for the first service with a low coding rate. The encoded bits are then formed into modulation symbols, which are then mapped to a frequency resource in the OFDM symbol(s). The frequency resources are typically represented by a set of resource elements that can carry data. The data carrying resource elements may be contiguous in the frequency domain as much as possible or the data carrying resource elements distributed in the frequency domain to achieve frequency diversity. For example, the frequency domain bundling illustrated in FIG. 17 can be achieved using both a low code rate that utilizes repetition/duplication and a mapping of the modulation symbols to blocks of resource elements distributed in the frequency domain.

Another variation of the frequency stacking is to employ frequency hopping when more than one OFDM symbol is used to transmit one data packet for the first service. The frequency hopping allows the frequency domain resources used in one OFDM symbol to be different from the frequency domain resources in another OFDM symbol, and thus frequency domain diversity can be achieved.

Another variation of frequency stacking incorporates spatial diversity. If, for example, M blocks of frequency domain resources are used to transmit the data for the first service, the precoding matrix used for one block of frequency domain resources is different from the precoding matrix used for another block of frequency domain resources. Beam sweeping, in which different beams are used to transmit the same data for the first service, can be used to achieve spatial diversity. Spatial diversity, or beam sweeping more particularly, can be used in the time domain as well by using more than one OFDM symbol to transmit the data for the first service.

Returning again to FIG. 14, if the resource blocks of the second service cannot accommodate two or more transmissions of the first service ("No" path out of decision step 1440), then the original transmission and the repetitions for the first service are aligned in time (step 1450) similar to the arrangement illustrated in FIG. 15 (and the other similar figures) instead of frequency stacked. Once the alignment of the original transmission and the repetition in the time/frequency domain has been determined (step 1445 or 1450), the processor 815 determines whether the size of the packet for the first service is fixed and known (step 1455). If the size of the packet is fixed and known ("Yes" path out of decision step 1455), then the processor 815 can dynamically select the MCS (Modulation and Coding Scheme) for the first service (step 1460). The size of the packet for the first service may be fixed and known for certain alarm messages and/or state-information packets for feedback loops in control systems.

In LTE networks the MCS is selected based on the channel condition and the resource blocks needed for the transmission of a certain transport block size is then selected from a look-up table. Puncture bundling employing different coding for the original transmission of data for the first service and one of the repetitions is the equivalent of lowering the coding rate. Further, the resource blocks assigned for puncturing might be limited. Accordingly, the MCS can be determined based on the number of punctures. In one embodiment this can be achieved using rate-matching that fully uses the available resources by selection of a higher MCS index and/or a higher bundling number such that the reliability target for the transmission of data for the first service could be guaranteed to be as high as possible for a given radio resource. For example, if the error target is $10^{-6}$ and the current MCS index setting has a BLER (BLock Error Ratio) target of $10^{-4}$, a bundle with two transmissions (i.e., the original transmission and one repetition) could be used to achieve the overall error target. If the available resource blocks cannot accommodate a bundle with two transmissions using the current MCS, the MCS index can be increased in both of the transmissions (e.g., to reach a BLER of $10^{-3.5}$) such that the available resource blocks can accommodate a bundle with two transmissions and eventually reach $10^{-7}$.

In another embodiment the BLER target (and consequently the MCS) is adjusted based on the number of punctures to efficiently use the resource blocks. For example, if the puncture bundle is limited to one TTI for the second service and does not carry over into another TTI then the number of punctures in the TTI can be determined. If the error target is $10^{-x}$, where x can be any real number greater than or equal to zero (but typically a real number greater than 5), and there is sufficient time for a bundle of y transmissions, where y is an integer greater than or equal to two, then the MCS can be selected to achieve a BLER target of $10^{(-x/y)}$.

Returning again to FIG. 14, if the size of the packet for the first service is not fixed and unknown ("No" path out of decision step 1455), then the transmission for the first service is coded using a fixed MC (step 1465). Once the transmission for the first service is coded using either a dynamically selected one (step 1460) or a fixed MCS (step 1465), the processor 815 of the transmitting node transmits the data for the first service via transceiver 810 to the receiving node 850 (step 1470).

Figure 18:
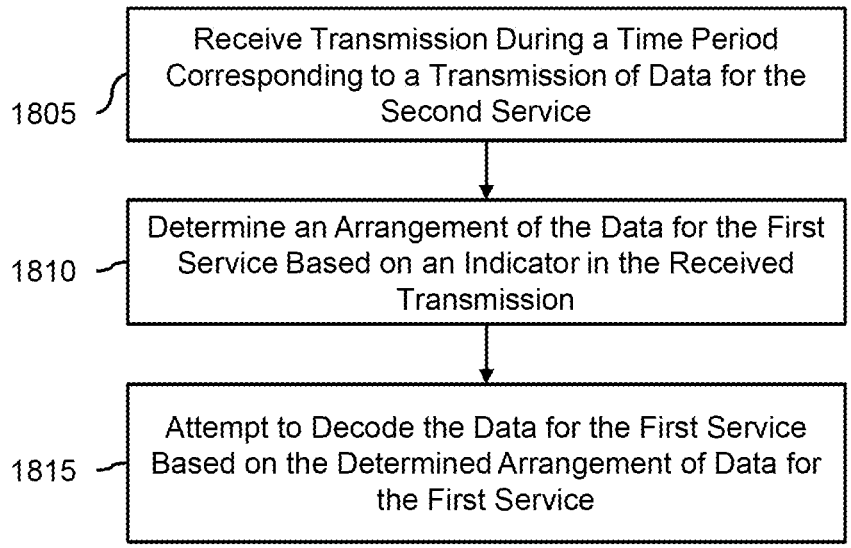
FIG. 18 is a high-level flow diagram of an exemplary reception method in accordance with exemplary embodiments of the present disclosure.

FIG. 18 is a high-level flow diagram of an exemplary reception method in accordance with exemplary embodiments of the present disclosure. Initially, the transceiver 855 of the receiving node 850 receives a transmission during a time period corresponding to a transmission of data for the second service and passes the transmission to the processor 860 (step 1805). The transmission includes data for a first service and data for a second service, wherein the data for the first service requires lower latency than the data for the second service. The processor 860 then determines an arrangement of the data for the first service based on an indicator in the received transmission (step 1810). The indicator can be the Puncture Bundle Indicator discussed above, which can include any of the information discussed above as part of this indicator. The processor 860 then attempts to decode the data for the first service based on the determined arrangement of data for the first service (step 1815).

In any of the embodiments above some aspects of the puncture bundle can be preconfigured. For example, the start-slot, end-slot, start-mini-slot, end-mini-slot, number of repetitions, types of repetitions (i.e., identical or different coding between the repetitions and the original data), combination of coding types for the original and repetitions in an RVG, the number of punctured areas, size of the punctured areas, deployment of the puncture bundle into the punctured areas, and the like can be predefined based on, for example, the MCS(s), the transport block size of the first service, and the transport block size of the second service. For example, if the data for the first and second services have the same MCS and the size of the transport blocks of the first and second services are known, the puncture bundling can be performed by having an original transmission of data for the first service in a predefined mini-slot of a slot, e.g., the second mini-slot, and the first and second repetition can be in the third and fourth mini-slot respectively. The slot can be composed of multiple mini-slots, for example 7 mini-slot, each mini-slot having two OFDM symbols. The Puncture Bundle Indicator can be used to identify this configuration to the receiving node. Alternatively or additionally, the receiving node can determine the punctured areas and the original and repetitions of data for the first service using a look-up table based on known parameters, such as the size of the transport block for the second service. This preconfiguration does not change the normal operation that uses a dedicated control region with information on the redundancy version, which is required in each punctured area to ensure each puncture can be independently received by the receiving node 850.

Figure 19:
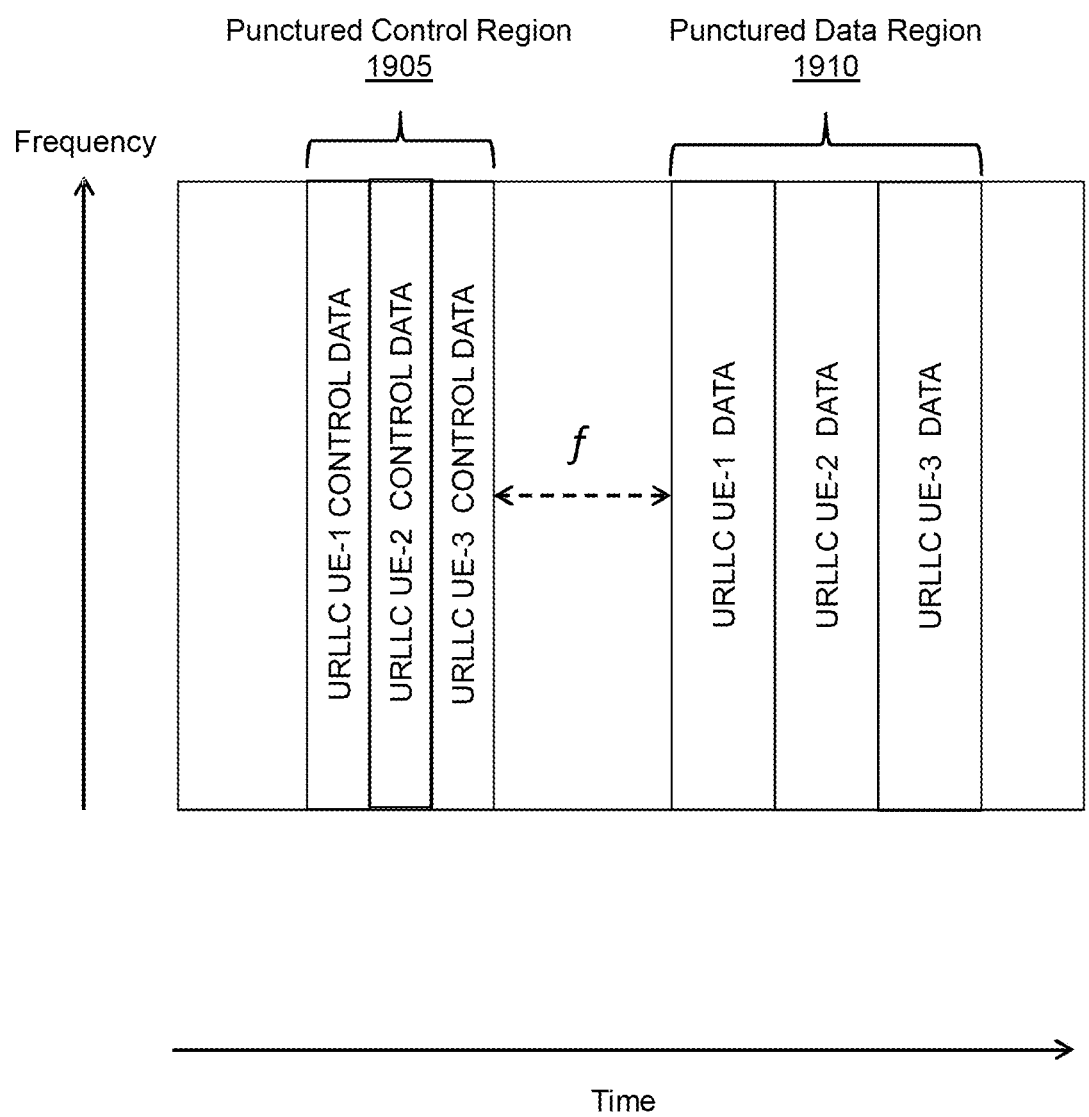
FIG. 19 is a block diagram of a punctured transmission in which the control data for the first service for a number of receiving nodes is grouped together and user data for the first service for the number of receiving nodes is grouped together in accordance with exemplary embodiments of the present disclosure.

Another preconfiguration can be to preconfigure the control and data for the first service into separate areas of the TTI of the second service, an example of which is illustrated in FIG. 19. As illustrated, separate control data for a number of receiving nodes 850 is included in punctured control region 1905 and data for the first service for a number of receiving nodes 850 can be included in a punctured user data region 1910. Regions 1905 and 1910 are be separated by a frequency amount f, which can be larger or equal to zero but in any event is preferably as small as possible. The control region can include, for example, the Puncture Bundle Indicator, the identification of receiving nodes, the MCS, etc., whereas the data region only includes data for the first service. Thus, the data included in the punctured data region 1910 can include both control data for the first service and user data for the first service but does not include control data identifying the formatting, modulation, coding and/or location of the user data for the first service.

In one embodiment discussed above, the receiving node 850 transmits a single HARQ feedback (i.e., ACK or NACK) for the puncture bundle, which covers both the original transmission and all repetitions. It was also described that when the receiving node 850 has successfully decoded the data for the first service the receiving node 850 discards any remaining repetitions. The discussion above did not address the particular timing of the HARQ feedback in this arrangement. The HARQ feedback can be sent either once the data for the first service has been successfully decoded or the feedback can be sent after receiving the last repetition corresponding to the original data of the first transmission. It should be recognized the receiving node need not discard any of the repetition and can employ the original transmission and all repetition in the decoding of the data for the first service.

According to another embodiment the base station, which is a transmitting node, can provide an immediate uplink grant as soon as there is an indication that decoding of the original data for the first service has failed. The immediate uplink grant can, for example, be scheduled after the last repetition of the original data for the first service. This, however, is not resource efficient because the delay between the base station transmitting the original puncture bundle and the additional repetition, which would occur in a subsequent time period, such as a subsequent TTI of the second service, may be too large to satisfy the low latency requirements of the first service.

The methods of FIGS. 13, 14, and 18 can be combined with the methods described in FIGS. 9-12.

It should be recognized that exemplary embodiments can be employed in both the uplink and downlink.

The discussion above refers to the first service as requiring lower latency than the second service. The first service could also require higher reliability than the second service and thus in some aspects the first service requires lower latency and higher reliability than the second service.

Although exemplary embodiments have been described with the data for the first service puncturing data for the second service, the bundle puncturing of the present disclosure can also be employed where there is no puncturing. Further, although exemplary embodiments have been described in which URLLC is the first service and MBB is the second service, the present disclosure is equally applicable to the transmission of any type of low latency service and puncturing any other type of service that does not have the same low latency requirements, such as massive Machine-Type Communication (mMTC), Multimedia Broadcast Multicast Services (MBMS), etc.

Although exemplary embodiments have been described with the time period for the transmission of the second service being a TTI, it should be recognized that a TTI may correspond to a subframe, a slot, or a mini-slot, and thus the terms subframe, slot, or mini-slot can be substituted for TTI in the discussion above.

Thus, the embodiments disclosed herein provide radio communication systems, devices and methods for enabling decoding of data for a first service having strict low latency requirements by including repetitions in the transmission punctured with the originally transmitted data. It should be understood that this description is not intended to limit the disclosure. On the contrary, the exemplary embodiments are intended to cover alternatives, modifications and equivalents, which are included in the spirit and scope of the disclosure. Further, in the detailed description of the exemplary embodiments, numerous specific details are set forth in order to provide a comprehensive understanding of the disclosure. However, one skilled in the art would understand that various embodiments might be practiced without such specific details.

Any appropriate steps, methods, or functions may be performed through a computer program product that may, for example, be executed by the components and equipment illustrated in one or more of the figures above. For example, memories 820 and 865 may comprise computer readable means on which computer programs can be stored. The computer program may include instructions which cause the processor 815 and 860, respectively (and any operatively coupled entities and devices, such as transceivers 810 and memory 820 and transceivers 855 and memory 865) to execute methods according to embodiments described herein. The computer programs and/or computer program products may thus provide means for performing any steps herein disclosed.

Any appropriate steps, methods, or functions may be performed through one or more functional modules or circuits. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by processors 815 and/or 860, possibly in cooperation with memory 820 and/or 865. Processors 815 and/or 860 and memory 820 and/or 865 may thus be arranged to allow processors 815 and/or 860 to fetch instructions from memories 820 and/or 865 and execute the fetched instructions to allow the respective functional module to perform any steps or functions disclosed herein.

Although the features and elements of the present exemplary embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a computer or a processor.

This written description uses examples of the subject matter disclosed to enable any person skilled in the art to practice the same, including making and using any devices or systems and performing any incorporated methods. The scope of the subject matter is defined by the claims, and may include other examples that occur to those skilled in the art. Such other examples are intended to be within the scope of the claims.

The invention claimed is:

1. A method implemented in a transmitting node, the method comprising:
   determining resources for data for a first service, wherein the resources for the data for the first service overlaps with the resources for the data for a second service during a time period, wherein the data for the first service includes an original set of data for the first service and at least one repetition of the original set of data for the first service;
   adjusting resources consumed by the data for the first service based on available transmission resources; and
   transmitting, during the time period, the data for the first service using the adjusted resources.

2. The method of claim 1, wherein the adjusting of resources consumed by the data for the first service comprises eliminating at least one of the at least one repetition.

3. The method of claim 1, wherein the adjusting of resources consumed by the data for the first service comprises shortening a time duration occupied by a repetition.

4. The method of claim 1, wherein frequency hopping is applied to the data for the first service.

5. The method of claim 4, wherein the frequency hopping is configured by a higher layer parameter.

6. The method of claim 4, wherein the frequency hopping is deactivated by a higher layer parameter.

7. The method of claim 4, wherein a configuration of frequency hopping is carried by a field in a downlink control information of the first service.

8. The method of claim 4, wherein at least one of the at least one repetition occupies different frequency domain resources than the frequency domain resources occupied by the original set of data.

9. The method of claim 1, wherein the original set of data for the first service includes control data and user data, and the control data and user data are repeated as a set.

10. The method of claim 1, wherein the original set of data for the first service includes control data and user data, and only user data is repeated.

11. The method of claim 1, further comprising:
   providing a signaling message separately from the transmission of the data for the first service, where the signaling message provides parameters for the at least one repetition.

12. The method of claim 11, wherein the signaling message identifies a start and end of the data for the first service.

13. The method of claim 11, wherein the signaling message provides a number of repetitions for the data for the first service.

14. The method of claim 1 further comprising:
   dynamically selecting a modulation and coding scheme from a set of modulation and coding schemes; and
   modulating and coding the data for the first service using the dynamically selected modulation and coding scheme.

15. The method of claim 1, wherein the original set of data for the first service and one of its repetitions are coded differently.

16. The method of claim 15, wherein different redundancy versions are applied to the original set of data and one of its repetition.

17. The method of claim 1, wherein the original data for the first service and one or more repetitions of the data for the first service are arranged adjacent to each other in time in the transmission.

18. The method of claim 17, where there is zero time gap between a pair of adjacent data.

19. The method of claim 17, where there is non-zero time gap between a pair of the adjacent data.

20. The method of claim 1, wherein the transmitting node is a first user equipment, and wherein a second user equipment transmits the data for the second service, and wherein the resources for the data of the second service overlaps in time or frequency with the resources for the data of the first service.

21. The method of claim 1, wherein the transmitting node is a first user equipment that also transmits the data for the second service, where the resources for the data of the first service overlaps in time or frequency with the resources for the data of the second service.

22. The method of claim 1, wherein the first service requires higher reliability than the second service.

23. The method of claim 1, wherein the first service is an Ultra-Reliable Low Latency Communication (URLLC) service and the second service is a Mobile Broadband (MBB) or enhanced MBB service.

24. The method of claim 1, wherein the time period is composed of one or more of: a transmission time interval (TTI), a slot, or a mini-slot of the second service.

25. A transmitting node comprising a wireless interface and processing circuitry configured for:
   determining resources for data for a first service, wherein the resources for the data for the first service overlaps with the resources for the data for a second service during a time period, wherein the data for the first service includes an original set of data for the first service and at least one repetition of the original set of data for the first service;
   adjusting resources consumed by the data for the first service based on available transmission resources; and
   transmitting, during the time period, the data for the first service using the adjusted resources.

26. The transmitting node of claim 25, wherein the transmitting node is a first user equipment, and wherein a second user equipment transmits the data for the second service, and wherein the resources for the data of the second service overlaps in time or frequency with the resources for the data of the first service.

27. The transmitting node of claim 25, wherein the transmitting node is a first user equipment that also transmits the data for the second service, where the resources for the data of the first service overlaps in time or frequency with the resources for the data of the second service.

* * * * *

UNITED STATES PATENT AND TRADEMARK OFFICE
CERTIFICATE OF CORRECTION

| | | |
|---|---|---|
| PATENT NO. | : 11,569,941 B2 | |
| APPLICATION NO. | : 17/168332 | |
| DATED | : January 31, 2023 | |
| INVENTOR(S) | : Zou et al. | |

It is certified that error appears in the above-identified patent and that said Letters Patent is hereby corrected as shown below:

On the Title Page

On Page 2, in Item (56), under "OTHER PUBLICATIONS", in Column 1, Line 2, delete "5 1.3 4," and insert -- 5.1.3.4, --, therefor.

On Page 2, in Item (56), under "OTHER PUBLICATIONS", in Column 2, Line 14, delete "Erricsson;" and insert -- Ericsson; --, therefor.

In the Specification

In Column 13, Line 43, delete "than" and insert -- then --, therefor.

In Column 13, Line 59, delete "$TBS_{SURLLC}>8192$" and insert -- $TBS_{URLLC}>8192$ --, therefor.

In Column 14, Line 59, delete "punctured eMBB area-k 1660" and insert -- punctured eMBB area-k 1670 --, therefor.

In Column 14, Line 60, delete "bundling end-slot m 1675." and insert -- bundling end-slot: m 1675. --, therefor.

In Column 17, Line 2, delete "fixed MC" and insert -- fixed MCS --, therefor.

Signed and Sealed this
Thirteenth Day of June, 2023

Katherine Kelly Vidal
*Director of the United States Patent and Trademark Office*